(12) United States Patent
Chui et al.

(10) Patent No.: US 8,270,469 B2
(45) Date of Patent: Sep. 18, 2012

(54) ENCODING VIDEO AT MULTIPLE RESOLUTION LEVELS

(75) Inventors: Charles K. Chui, Menlo Park, CA (US); Haishan Wang, San Carlos, CA (US)

(73) Assignee: Precoad Inc., Menlo Park, CA (US)

( * ) Notice: Subject to any disclaimer, the term of this patent is extended or adjusted under 35 U.S.C. 154(b) by 1585 days.

(21) Appl. No.: 11/639,780

(22) Filed: Dec. 15, 2006

(65) Prior Publication Data

US 2008/0144711 A1     Jun. 19, 2008

(51) Int. Cl.
*H04N 7/12*     (2006.01)
(52) U.S. Cl. .................................... 375/240.01
(58) Field of Classification Search ........... 375/240, 375/240.01–240.27; 382/200, 240, 261, 382/243, 260; 380/200; 348/14.07, 589, 348/408.1; 725/90
See application file for complete search history.

(56) References Cited

U.S. PATENT DOCUMENTS

| | | | | |
|---|---|---|---|---|
| 4,344,086 A | | 8/1982 | Mizuno | 358/78 |
| 5,533,138 A | | 7/1996 | Kim et al. | 382/232 |
| 6,005,981 A | * | 12/1999 | Ng et al. | 382/240 |
| 6,041,143 A | | 3/2000 | Chui et al. | 382/232 |
| 6,246,797 B1 | | 6/2001 | Castor et al. | 382/232 |
| 2002/0001350 A1 | | 1/2002 | Wu et al. | 375/240.26 |
| 2003/0011714 A1 | * | 1/2003 | Nevins, Jr. | 348/589 |
| 2003/0012376 A1 | * | 1/2003 | Wee et al. | 380/200 |
| 2003/0106063 A1 | * | 6/2003 | Guedalia | 725/90 |
| 2008/0068446 A1 | * | 3/2008 | Barkley et al. | 348/14.07 |
| 2008/0069469 A1 | * | 3/2008 | Yan et al. | 382/261 |

FOREIGN PATENT DOCUMENTS

JP     11032328     2/1999

OTHER PUBLICATIONS

International Search Report for International Application No. PCT/US2007/084941, dated Feb. 27, 2008.
Pyy, H., et al., "Virtual Magnifying Glass 3.3, A Free, Open Source Screen Magnifier, for Windows, Linux and Free BSD," http://magnifier.sourceforge.net, Aug. 13, 2007, pp. 1-8.

* cited by examiner

*Primary Examiner* — Thai Tran
*Assistant Examiner* — Stephen Smith
(74) *Attorney, Agent, or Firm* — Morgan, Lewis & Bockius LLP

(57) ABSTRACT

A method and related system of encoding or re-encoding video is disclosed. In the method, video data comprising a sequence of frames is received. For a respective frame in the sequence of frames, a multi-level frame is generated comprising the respective frame and a plurality of copies of the respective frame. Each copy has an associated video resolution level that is a member of a predefined range of video resolution levels, ranging from a highest video resolution level to a lowest video resolution level. The multi-level frame is encoded.

21 Claims, 15 Drawing Sheets

ENCODING VIDEO AT MULTIPLE RESOLUTION LEVELS

TECHNICAL FIELD

The disclosed embodiments relate generally to encoding and displaying video, and more particularly, to a method and system of enabling high-resolution zooming and panning of displayed video.

BACKGROUND

Many modern devices for displaying video, such as high-definition televisions, computer monitors, and cellular telephone display screens, allow users to manipulate the displayed video by zooming. In traditional systems for zooming video, the displayed resolution of the video decreases as the zoom factor increases. This decreased resolution can result in pixelization effects that cause a zoomed video to appear blurry. Blurriness increases with the zoom factor, preventing a user from being able to view details of the zoomed video and resulting in an unpleasant viewing experience.

Users also may desire to pan the displayed video. A combination of zoom and pan commands would allow a user to focus in on a selected portion of the video. The selected portion of the video sometimes is referred to as the display window.

Traditional methods and systems, however, may require a user to download and decode bitstreams corresponding to entire video frames, even though the user is only viewing the portion of the frames within the display window, as specified by zoom and pan commands. Unnecessary downloading and decoding of entire frames is an inefficient use of bandwidth and computational power.

Accordingly, there is a need for video encoders and for video distribution systems that provide multiple levels of resolution depending on the zoom factor. There also is a need for systems of providing and displaying video that provide, decode, and display only the portions of video frames within the display window.

SUMMARY

A method of encoding or re-encoding video is disclosed. In the method, video data comprising a sequence of frames is received. For a respective frame in the sequence of frames, a multi-level frame is generated comprising the respective frame and a plurality of copies of the respective frame. Each copy has an associated video resolution level that is a member of a predefined range of video resolution levels, ranging from a highest video resolution level to a lowest video resolution level. The multi-level frame is encoded.

In some embodiments, the video data comprise a MPEG-2, MPEG-4, H.263, or H.264 bitstream. In some embodiments, the video data comprise raw video data. In some embodiments, the plurality of copies is generated by performing anti-aliased down-sample filtering, also known as anti-aliased down-sampling. In some embodiments, each copy in the plurality of copies is partitioned into tiles and the tiles are encoded. At least one encoded tile may be stored as an independent file. The tiles may be encoded using an MPEG-2, MPEG-4, H.263, or H.264 encoder. In some embodiments, each of the tiles is encoded as a plurality of macro-blocks. At least one of the macro-blocks of a respective tile is dual encoded as both an intra-coded bitstream, without predictive coding, and an inter-coded bitstream, with predictive coding.

In some embodiments, a bitstream corresponding to a portion of a frame in the sequence of frames is transmitted to a client system in accordance with a pan position and a zoom factor. The portion of the frame comprises a plurality of tiles corresponding to a display window. The plurality of tiles includes a tile having at least one macro-block that is dual encoded. The intra-coded bitstream of the dual encoded macro-block is transmitted when the inter-coded bitstream references data in a tile outside the display window.

A method of encoding video is disclosed. Video data corresponding to a sequence of images is received. A multi-level frame corresponding to an image in the sequence of images is generated, comprising a frame and a plurality of copies of the frame. Each copy has an associated video resolution level that is a member of a predefined range of video resolution levels, ranging from a highest video resolution level to a lowest video resolution level. The multi-level frame is encoded.

A method of displaying video, for use in conjunction with a video display device, is disclosed. Video data is received from a video data source that comprises a sequence of multi-level frames. A respective multi-level frame comprises a plurality of copies of a respective frame. Each copy has an associated video resolution level that is a member of a predefined range of video resolution levels, ranging from a highest video resolution level to a lowest video resolution level. The received video data comprise, for a respective multi-level frame, at least a portion of the copy having a desired resolution level. At least a portion of the received video data is decoded. The decoded video data is displayed.

In some embodiments, the received video data are in standard video syntax. The standard video syntax may be compatible with MPEG-2, MPEG-4, H.263, or H.264 decoders. In some embodiments, the desired resolution level is determined based on a specified zoom factor for displaying the video. The desired resolution level may be a highest resolution level allowable for the video display device at the specified zoom factor.

In some embodiments, the method of displaying video includes requesting the video data. The request specifies a video resolution level based on the specified zoom factor. The request may specify a subset of the respective multi-level frame in accordance with the specified zoom factor and a pan position of the displayed image.

In some embodiments, the received video data include a plurality of tiles. At least one of the tiles comprises a plurality of intra-coded macro-blocks and at least one of the tiles comprises a plurality of inter-coded macro-blocks. In some embodiments, a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding.

A system for encoding or re-encoding video is disclosed. The system comprises memory, one or more processors, and one or more programs stored in the memory and configured for execution by the one or more processors. The one or more programs include instructions for receiving video data comprising a sequence of frames and for generating, for a respective frame in the sequence of frames, a multi-level frame. The multi-level frame comprises the respective frame and a plurality of copies of the respective frame. Each copy has an associated video resolution level that is a member of a predefined range of video resolution levels, ranging from a highest video resolution level to a lowest video resolution level. The one or more programs also include instructions for encoding the multi-level frame. In some embodiments, the instructions for encoding the multi-level frame include instructions for encoding the respective frame at a respective video resolution level as a plurality of tiles, for encoding each of the tiles as a plurality of macro-blocks, and for dual encoding at least one of the macro-blocks of a respective tile as both an intra-coded bitstream, without predictive coding, and an inter-coded bitstream, with predictive coding.

A system for displaying video, for use in conjunction with a video display device, is disclosed. The system comprises memory, one or more processors, and one or more programs stored in the memory and configured for execution by the one or more processors. The one or more programs include instructions for receiving video data from a video data source. The video data source comprises a sequence of multi-level frames, wherein a respective multi-level frame comprises a plurality of copies of a respective frame. Each copy has an associated video resolution level that is a member of a predefined range of video resolution levels, ranging from a highest video resolution level to a lowest video resolution level. The received video data comprise, for a respective multi-level frame, at least a portion of the copy having a desired resolution level. The one or more programs also include instructions for decoding at least a portion of the received video data and instructions for displaying the decoded video data.

In some embodiments, the received video data include a plurality of tiles. At least one of the tiles comprises a plurality of intra-coded macro-blocks and at least one of the tiles comprises a plurality of inter-coded macro-blocks. In some embodiments, a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding.

A computer program product is disclosed, comprising a computer readable storage medium and a computer program mechanism embedded therein. The computer program mechanism comprises instructions for receiving video data comprising a sequence of frames and for generating, for a respective frame in the sequence of frames, a multi-level frame. The multi-level frame comprises the respective frame and a plurality of copies of the respective frame. Each copy has an associated video resolution level that is a member of a predefined range of video resolution levels, ranging from a highest video resolution level to a lowest video resolution level. The computer program mechanism also comprises instructions for encoding the multi-level frame. In some embodiments, instructions for encoding the multi-level frame include instructions for encoding the respective frame at a respective video resolution level as a plurality of tiles, for encoding each of the tiles as a plurality of macro-blocks, and for dual encoding at least one of the macro-blocks of a respective tile as both an intra-coded bitstream, without predictive coding, and an inter-coded bitstream, with predictive coding.

A computer program product is disclosed for use in conjunction with a video display device. The computer program product comprises a computer readable storage medium and a computer program mechanism embedded therein. The computer program mechanism comprises instructions for receiving video data from a video data source. The video data source comprises a sequence of multi-level frames, wherein a respective multi-level frame comprises a plurality of copies of a respective frame. Each copy has an associated video resolution level that is a member of a predefined range of video resolution levels, ranging from a highest video resolution level to a lowest video resolution level. The received video data comprise, for a respective multi-level frame, at least a portion of the copy having a desired resolution level. The computer program mechanism also comprises instructions for decoding at least a portion of the received video data and instructions for displaying the decoded video data.

In some embodiments, the received video data includes a plurality of tiles. At least one of the tiles comprises a plurality of intra-coded macro-blocks and at least one of the tiles comprises a plurality of inter-coded macro-blocks. In some embodiments, a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding.

A system for encoding video is disclosed. The system comprises means for receiving video data comprising a sequence of frames and for generating, for a respective frame in the sequence of frames, a multi-level frame. The multi-level frame comprises the respective frame and a plurality of copies of the respective frame. Each copy has an associated video resolution level that is a member of a predefined range of video resolution levels, ranging from a highest video resolution level to a lowest video resolution level. The system also comprises means for encoding the multi-level frame.

A system for displaying video is disclosed, for use in conjunction with a video display device. The system comprises means for receiving video data from a video data source. The video data source comprises a sequence of multi-level frames, wherein a respective multi-level frame comprises a plurality of copies of a respective frame. Each copy has an associated video resolution level that is a member of a predefined range of video resolution levels, ranging from a highest video resolution level to a lowest video resolution level. The received video data comprise, for a respective multi-level frame, at least a portion of the copy having a desired resolution level. The system also comprises means for decoding at least a portion of the received video data and means for displaying the decoded video data.

A method of displaying video is disclosed, for use in conjunction with a video display device. Video data is received comprising a sequence of multi-level frames. A respective multi-level frame comprises a plurality of copies of a respective frame. Each copy has an associated video resolution level that is a member of a predefined range of video resolution levels, ranging from a highest video resolution level to a lowest video resolution level. For a respective multi-level frame, a desired resolution level is determined. At least a portion of the copy having the desired resolution level is decoded. The decoded video data is displayed.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
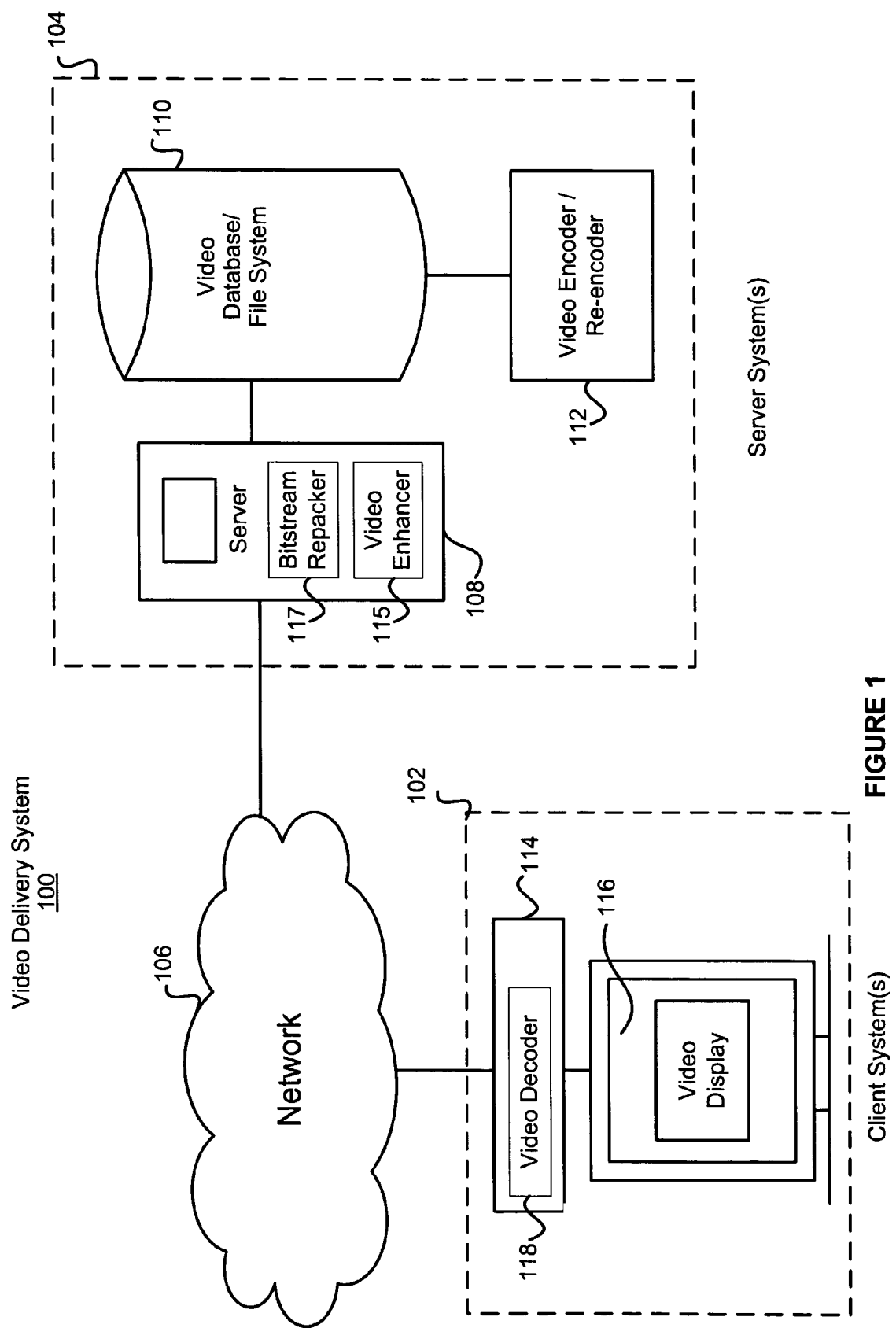
FIG. 1 is a block diagram illustrating a video delivery system in accordance with some embodiments.

FIG. 1 is a block diagram illustrating a video delivery system in accordance with some embodiments. The video delivery system 100 includes a server system 104. The server system 104 is coupled to one or more client systems 102 by a network 106. The network 106 may be any suitable wired and/or wireless network and may include a cellular telephone network, a cable television network, satellite transmission, telephone lines, a local area network (LAN), a wide area network (WAN), the Internet, a metropolitan area network (MAN), WIFI, WIMAX, or any combination of such networks.

The server system 104 includes a server 108, a video database or file system 110 and a video encoder/re-encoder 112. Server 108 serves as a front-end for the server system 104. Server 108, sometimes called a front end server, retrieves video from the video database or file system 110, and also provides an interface between the server system 104 and the client systems 102. In some embodiments, server 108 includes a bitstream repacker 117 and a video enhancer 115. In some embodiments, bitstream repacker 117 repacks at least a portion of a bitstream comprising video data with multiple levels of resolution to a standard bitstream. In some embodiments, video enhancer 115 eliminates artifacts associated with encoding and otherwise improves video quality. Bitstream repacker 117 and video enhancer 115 may each be implemented in hardware or in software.

In some embodiments, the video encoder/re-encoder 112 re-encodes video data received from the video database or file system 110. In some embodiments, the received video data is stored in the video database or file system 110 in one or more standard video formats, such as MPEG-2, MPEG-4, H.263, and/or H.264. The re-encoded video data may be stored in the video database or file system 110 as well. In some embodiments, the video encoder/re-encoder 112 encodes video data received from a video camera such as a camcorder (not shown). In some embodiments, the video data received from the video camera is raw video data, such as pixel data. In some embodiments, the video encoder/re-encoder 112 is separate from the server system 104 and transmits encoded or re-encoded video data to the server system 104 via a network connection (not shown) for storage in the video database or file system 110.

In some embodiments, the functions of server 108 may be divided or allocated among two or more servers. In some embodiments, the server system 104, including the server 108, the video database or file system 110, and the video encoder/re-encoder 112 may be implemented as a distributed system of multiple computers and/or video processors. However, for convenience of explanation, the server system 104 is described below as being implemented on a single computer, which can be considered a single logical system.

A user interfaces with the server system 104 and views video at a client system or device 102 (hereinafter called the client system for ease of reference). The client system 102 includes a computer 114 or computer-controlled device, such as a set-top box (STB), cellular telephone or the like. The computer 114 typically includes one or more processors (not shown); memory, which may include volatile memory (not shown) and non-volatile memory such as a hard disk drive (not shown); a video decoder 118; and a display 116. Video decoder 118 may be implemented in hardware or in software. In some embodiments, computer-controlled device 114 is integrated into display 116. Computer-controlled device 114 may also have user input devices or interfaces such as a keypad, remote control, keyboard, or mouse (not shown). In some embodiments, a user may interact with the server system 104 via one or more input devices to zoom or pan video displayed on display 116.

Figure 2:
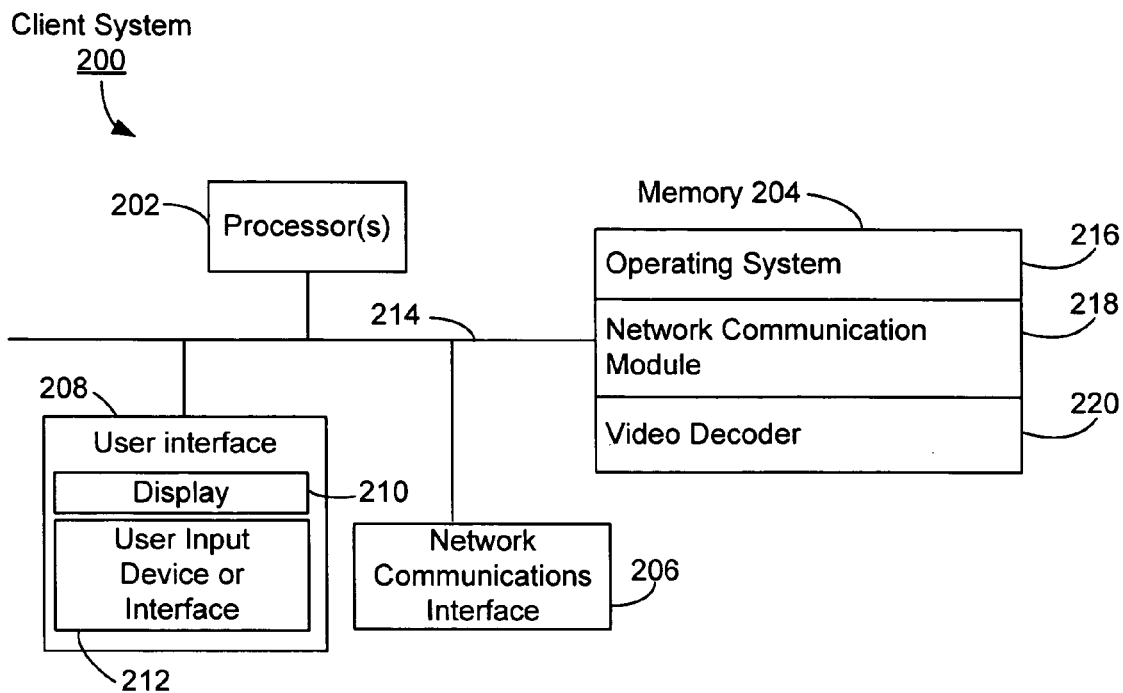
FIG. 2 is a block diagram illustrating a client system in accordance with some embodiments.

FIG. 2 is a block diagram illustrating a client system in accordance with some embodiments. The client system 200 typically includes one or more processors 202, one or more network or other communications interfaces 206, memory 204, and one or more communication buses 214 for interconnecting these components. The communication buses 214 may include circuitry (sometimes called a chipset) that interconnects and controls communications between system components. The client computer 200 may also include a user interface 208 comprising a display device 210 and a user input device or interface 212. In some embodiments, user input device or interface 212 includes a keypad, a remote control, a keyboard, or a mouse. Memory 204 includes high-speed random access memory, such as DRAM, SRAM, DDR RAM or other random access solid-state memory devices, and may include non-volatile memory, such as one or more magnetic disk storage devices, optical disk storage devices, flash memory devices, or other non-volatile solid-state storage devices. Memory 204 may optionally include one or more storage devices remotely located from the processor(s) 202. In some embodiments, memory 204 stores the following programs, modules and data structures, or a subset thereof:

- an operating system 216 that includes procedures for handling various basic system services and for performing hardware dependent tasks;
- a network communication module 218 that is used for connecting the client system 200 to other computers via the one or more communication network interfaces 206 and one or more communication networks, such as the Internet, other wide area networks, local area networks, metropolitan area networks, and so on; and a video decoder module 220 for decoding received video. In some embodiments, received video may be cached locally in memory 204.

Each of the above identified elements in FIG. 2 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 204 may store a subset of the modules and data structures identified above. Furthermore, memory 204 may store additional modules and data structures not described above.

Figure 3:
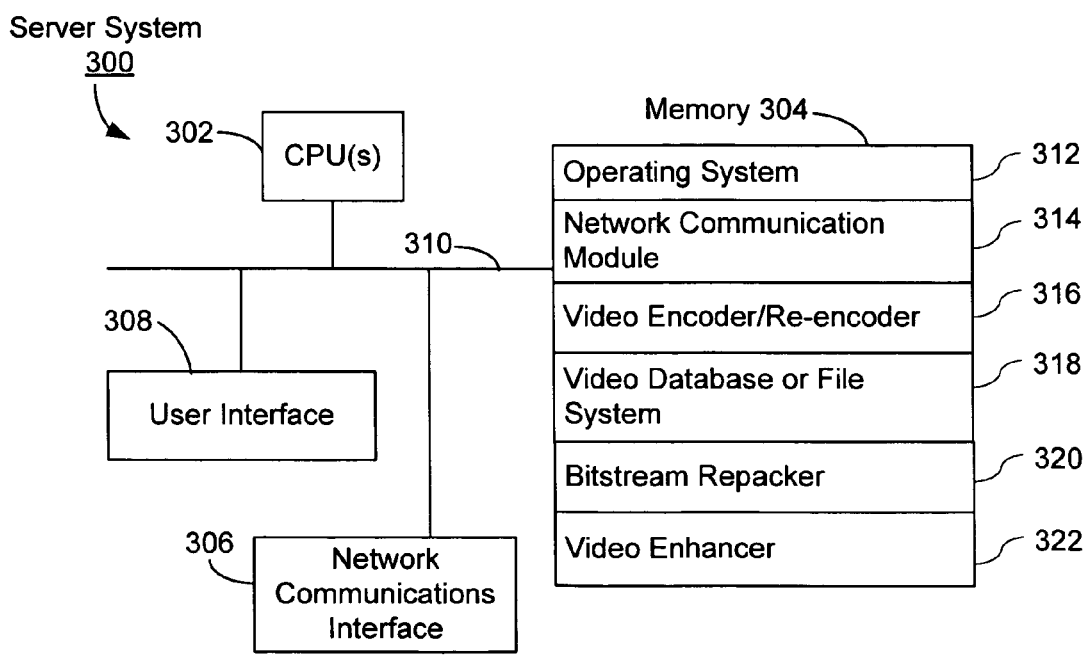
FIG. 3 is a block diagram illustrating a server system in accordance with some embodiments.

FIG. 3 is a block diagram illustrating a server system 300 in accordance with some embodiments. The server system 300 typically includes one or more processing units (CPU's) 302, one or more network or other communications interfaces 306, memory 304, and one or more communication buses 310 for interconnecting these components. The CPU(s) 302 may include one or more video processors. The communication buses 310 may include circuitry (sometimes called a chipset) that interconnects and controls communications between system components. The server system 300 optionally may include a user interface 308, which may include a display device (not shown), and a keyboard and/or a mouse (not shown). Memory 304 includes high-speed random access memory, such as DRAM, SRAM, DDR RAM or other random access solid-state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU(S) 302. In some embodiments, memory 304 stores the following programs, modules and data structures, or a subset thereof:

- an operating system 312 that includes procedures for handling various basic system services and for performing hardware dependent tasks;
- a network communication module 314 that is used for connecting the server system 300 to other computers via the one or more communication network interfaces 306 and one or more communication networks, such as the Internet, other wide area networks, local area networks, metropolitan area networks, cellular telephone networks, cable television networks, satellite, and so on;
- a video encoder/re-encoder module 316 for encoding video in preparation for transmission via the one or more communication network interfaces 306;
- a video database or file system 318 for storing video.
- a bitstream repacking module 320 for repacking at least a portion of a bitstream comprising video data with multiple levels of resolution to a standard bitstream; and
- a video enhancer module 322 for eliminating artifacts associated with encoding and otherwise improving video quality.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 304 may store a subset of the modules and data structures identified above. Furthermore, memory 304 may store additional modules and data structures not described above.

Although FIG. 3 shows a "server system," FIG. 3 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers and/or video processors.

Figure 4:
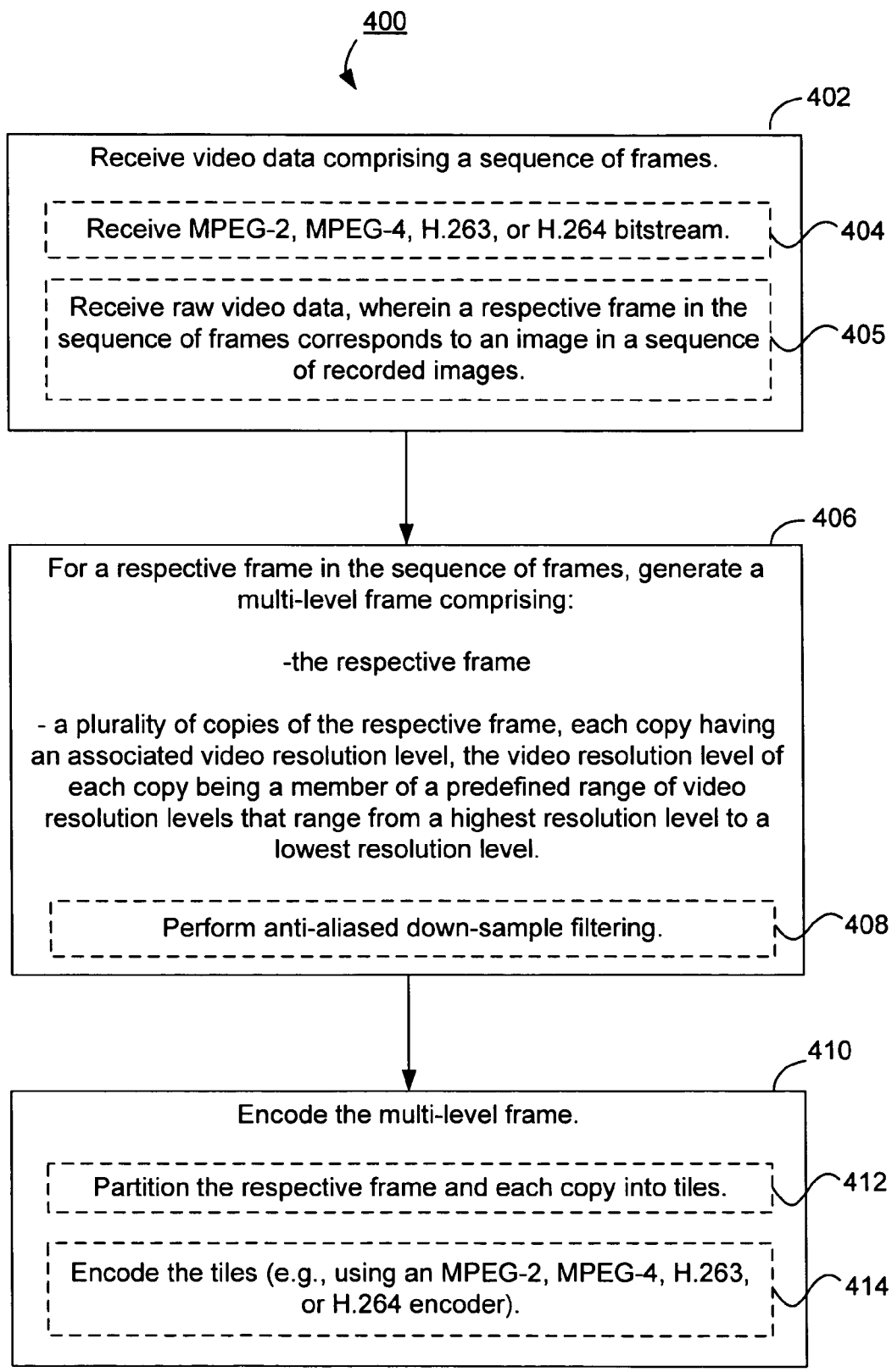
FIG. 4 is a flow diagram illustrating a process for encoding video, in accordance with some embodiments.

FIG. 4 is a flow diagram illustrating a process 400 for encoding video, in accordance with some embodiments. Process 400 occurs at a server system such as server system 104. Video data comprising a sequence of frames is received (402). In some embodiments, the sequence of frames is an MPEG-2, MPEG-4, H.263, or H.264 bitstream (404). In some embodiments, the sequence of frames is raw video data, wherein a respective frame in the sequence of frames corresponds to an image in a sequence of recorded images.

For a respective frame in the sequence of frames, a multi-level video frame is generated (406). The multi-level frame comprises the respective frame and a plurality of copies of the respective frame. Each copy has an associated video resolution level that is a member of a predefined range of video resolution levels that range from a highest video resolution level to a lowest video resolution level. In some embodiments, the copies are generated by performing anti-aliased down-sample filtering (also called anti-aliased down-sampling) on the respective frame (408): the frame image is reconstructed and then down-sampled. The multi-level frame is encoded (410). In some embodiments, encoding the multi-level frame includes partitioning each copy into tiles (412). In some embodiments, the tiles are then encoded (414). For example, the tiles may be encoded using an MPEG-2, MPEG-4, H.263, or H.264 encoder.

Figure 5:
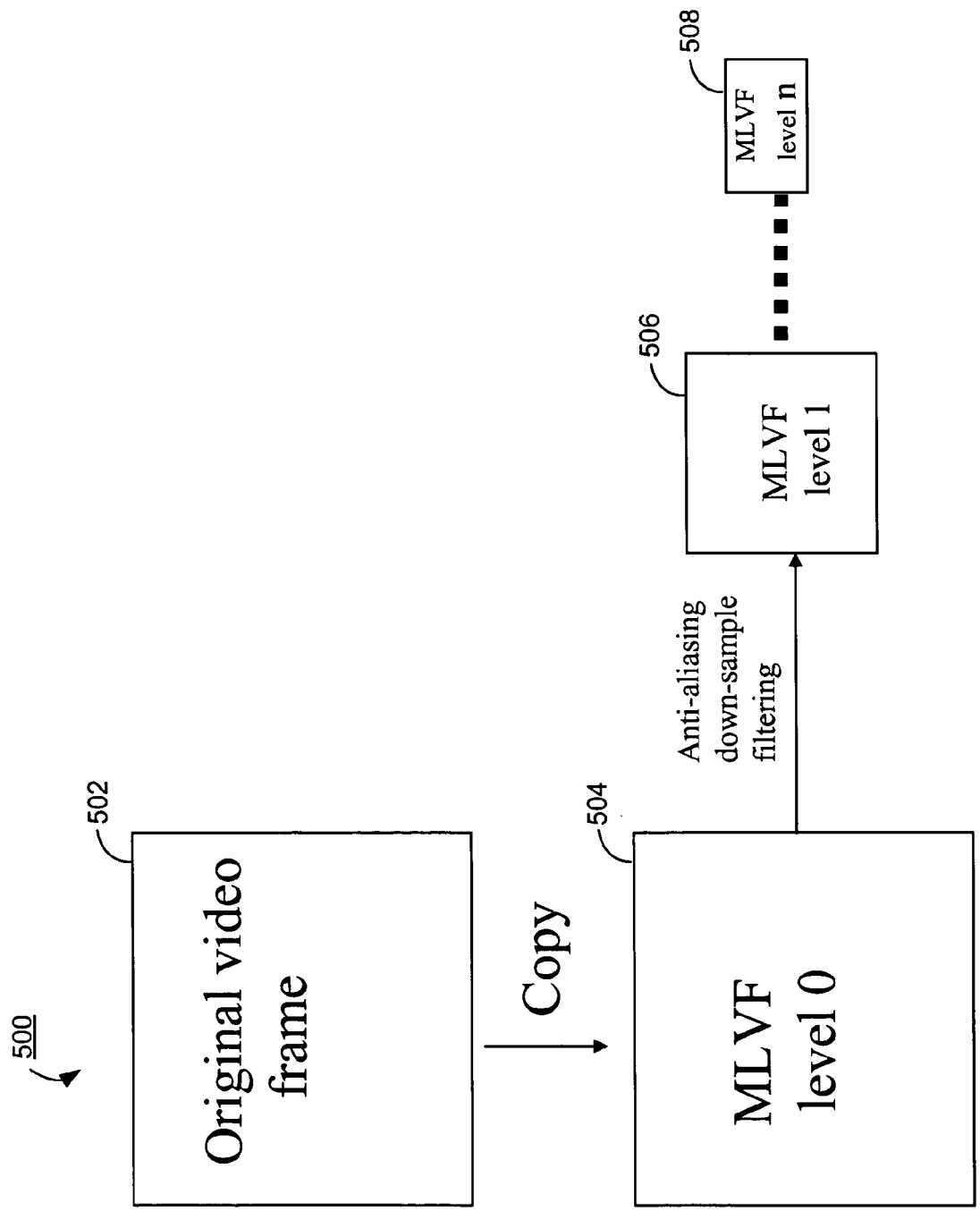
FIG. 5 is a flow diagram illustrating a process for generating a multi-level video frame, in accordance with some embodiments.

FIG. 5 is a flow diagram illustrating a process 500 for generating a multi-level video frame (MLVF), in accordance with some embodiments. As described above in step 406 of process 400, a multi-level frame is generated from an original video frame 502. The original video frame 502 is copied to create level 0 (504) of the MLVF. Anti-aliased down-sampling is performed on level 0 of the MLVF to create additional copies of the original frame, labeled level 1 (506) through level n (508). In some embodiments, each level of the MLVF has an associated video resolution level that is a member of a predefined range of video resolution levels that range from a highest video resolution level to a lowest video resolution level. In some embodiments, level 0 is the highest video resolution level and level n is the lowest video resolution level. In some embodiments, n is equal to 4 or 5, meaning that the MLVF comprises 5 or 6 levels respectively. In some embodiments, n is equal to 16, meaning that the MLVF comprises 17 levels.

Figure 6:
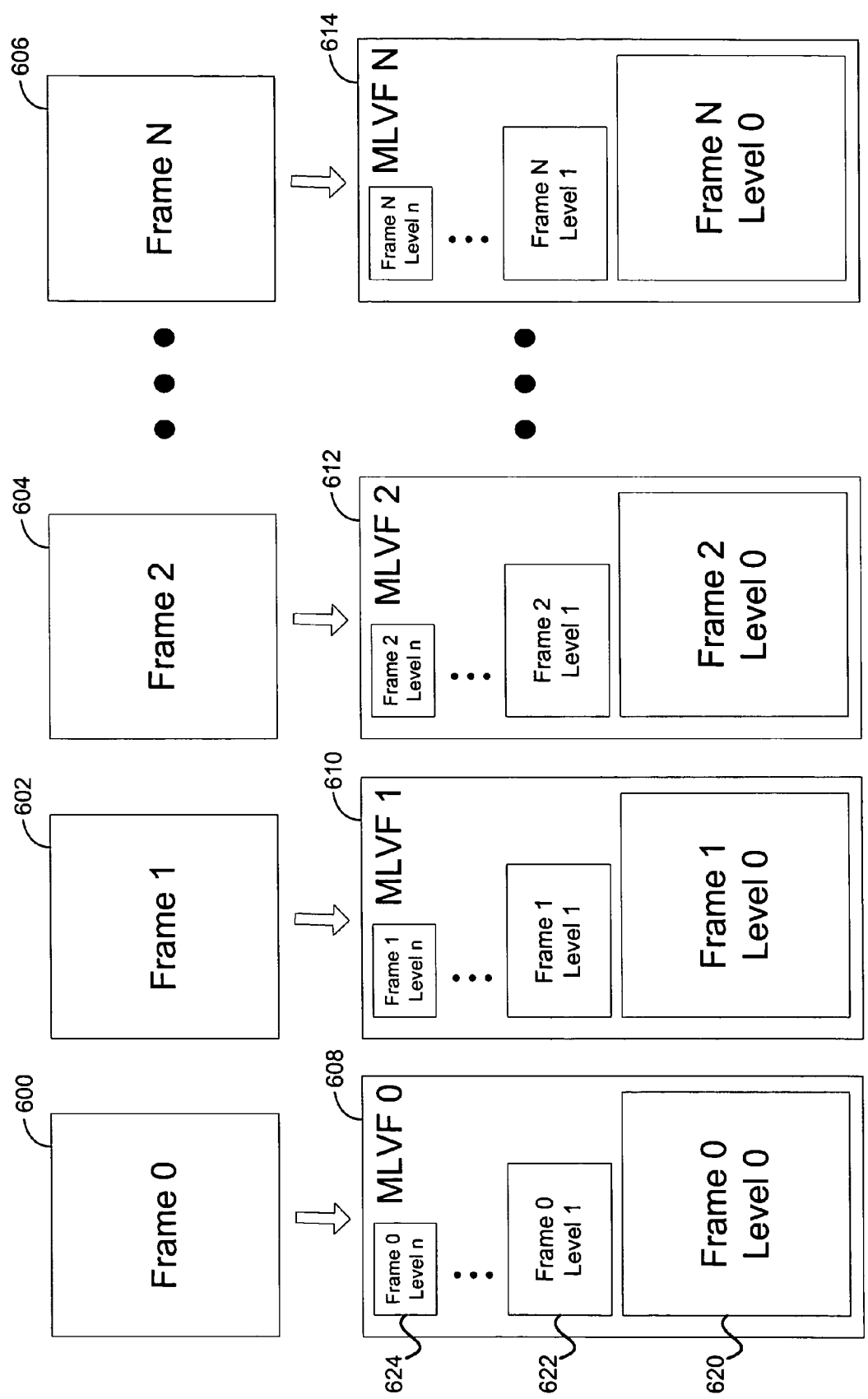
FIG. 6 is a block diagram illustrating a sequence of multi-level video frames, in accordance with some embodiments.

FIG. 6 is a block diagram illustrating a sequence of multi-level video frames, in accordance with some embodiments. A sequence of frames including frames 600, 602, 604, and 606 (i.e., frame 0 through frame N) comprises video data such as the video data received in step 402 of process 400 (FIG. 4). For each frame in the sequence of frames, a MLVF is generated, for example, in accordance with process 500 (FIG. 5). Thus, MLVF 0 (608) is generated from frame 0 (600) and comprises n copies of frame 0, labeled level 0 (620) through level n (624). In some embodiments, each level has an associated video resolution level that is a member of a predefined range of video resolution levels that range from a highest video resolution level to a lowest video resolution level. Application of the copying process, for example process 500, to each frame results in a sequence of multi-level video frames including MLVF's 608, 610, 612, and 614 (i.e., MLVF 0 through MLVF N).

Figure 7:
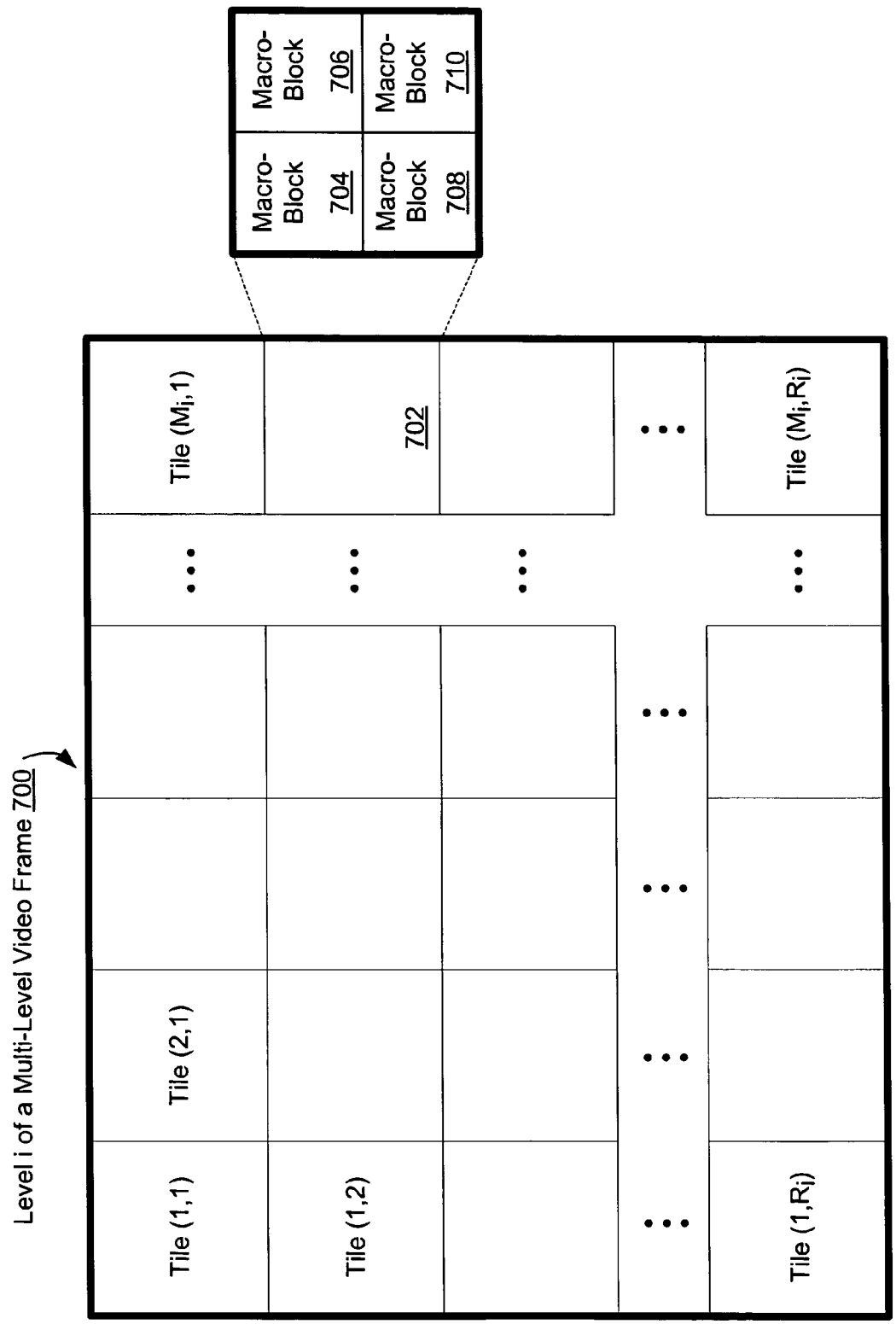
FIG. 7 is a block diagram illustrating a partitioned level of a multi-level video frame, in accordance with some embodiments.

In some embodiments, each level of a multi-level video frame is partitioned into tiles. FIG. 7 is a block diagram illustrating a partitioned level 700 of a multi-level video frame, in accordance with some embodiments. Partitioned level 700 comprises an $M_i$-by-$R_i$ array of tiles, labeled (1,1) through $(M_i, R_i)$, where i is an integer ranging between zero and n that corresponds to the level (see FIG. 6). In some embodiments, $M_i$ and $R_i$ are integer multiples of 16. For example, $$M_i = 16 \times m$$

$$R_i = 16 \times r$$

where m and r are integers less than or equal to 32, but are not necessarily identical. In some embodiments, for interlaced video, $R_i$ is an integer multiple of 8. For example, $$R_i = 8 \times r$$

where r is an integer less than or equal to 32. In some embodiments, a particular level has one-quarter as many tiles as the next highest resolution level, such that $M_i = 0.5 \times M_{i-1}$ and $R_i = 0.5 \times R_{i-1}$ (where a lower value of i corresponds to a higher resolution level).

In some embodiments, tiles are partitioned into macro-blocks (MBs). For example, tile 702 is partitioned into four MBs 704, 706, 708, and 710. Other tile partitioning schemes are possible. For example, a tile may be partitioned into 16 MBs (not shown). In some embodiments, the number of macro blocks per tile is constant for all levels in the MLVF.

Each macro-block includes a set of pixels, for example, a 16-by-16 array of pixels. In some embodiments, the content of each macro-block is determined in accordance with an encoding standard. For example, each macro-block in frame 700 may correspond to a macro-block in an MPEG encoding standard, such as MPEG-2.

Figure 8:
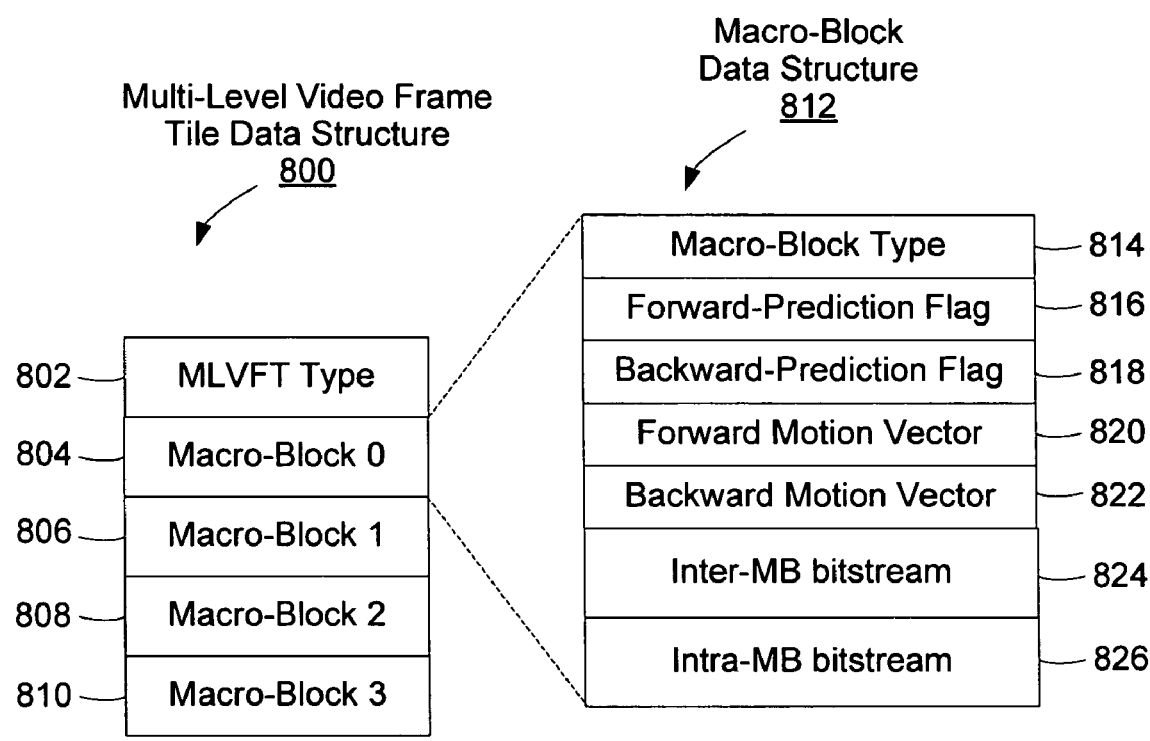
FIG. 8 is a block diagram illustrating data structures for multi-level video frame tiles and macro-blocks, in accordance with some embodiments.

FIG. 8 is a block diagram illustrating data structures for multi-level video frame tiles (MLVFT's) and macro-blocks, in accordance with some embodiments. MLVFT data structure 800 includes MLVFT type field 802, which specifies whether the tile is intra-type or inter-type (also called intra-coded and inter-coded), and macro-blocks 0-3 (804, 806, 808, and 810). An intra-type tile, or intra-tile, is a tile for which all macro-blocks in the tile are intra-MBs (also called intra-coded macro-blocks). An intra-MB is a macro-block that does not use predictive coding; it contains all data needed to display its corresponding portion of an image. Otherwise, the tile contains at least one inter-MB (also called inter-coded macro-block) and therefore is an inter-type tile, or inter-tile. The use of predictive coding for inter-MB's is referred to as motion compensation.

While MLVFT data structure 800 includes four macro-blocks, other numbers of MB's per tile are possible. For example, in another embodiment there are 16 MB's per tile.

Figure 9A:
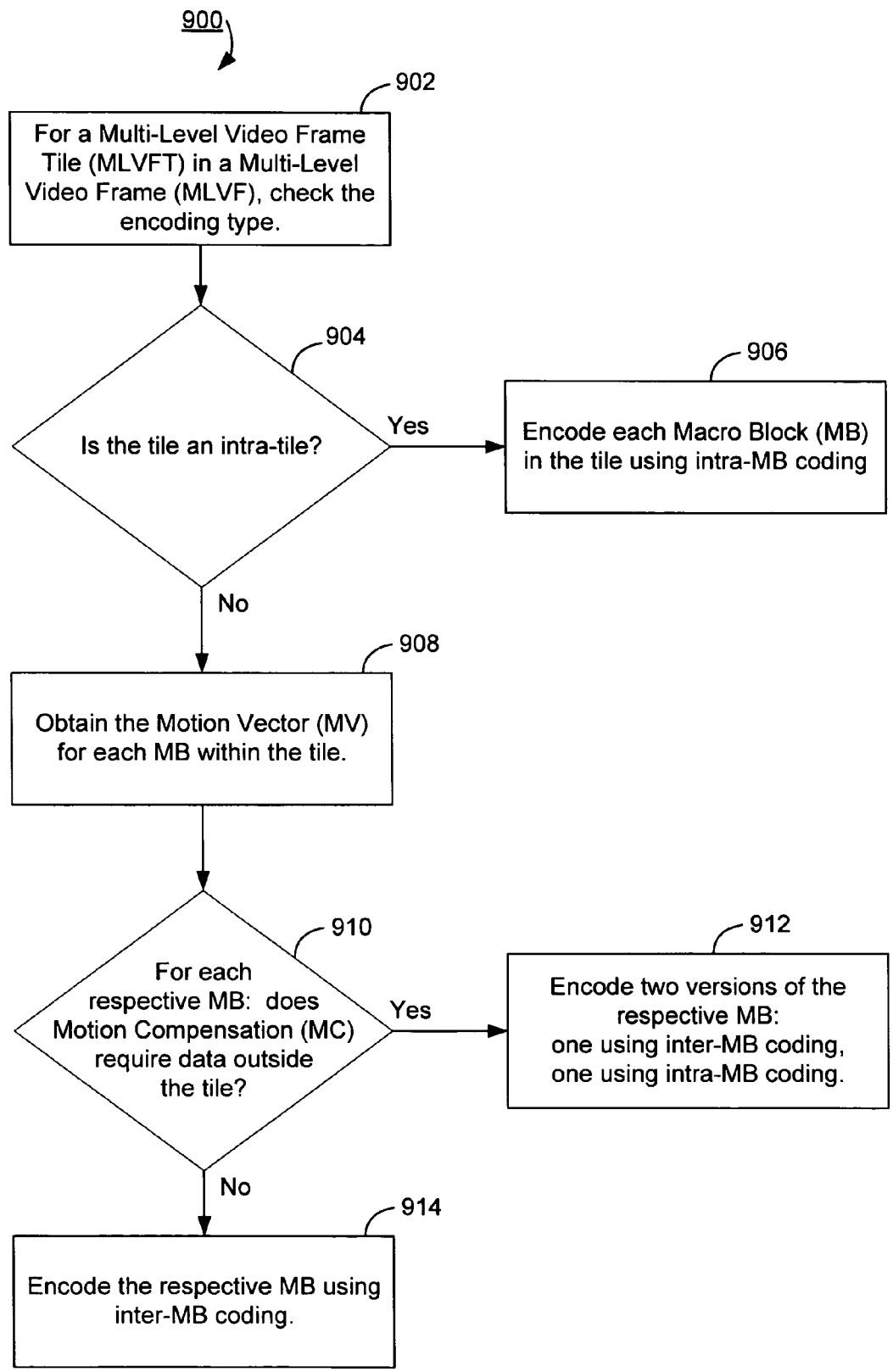
FIGS. 9A & 9B are flow diagrams illustrating a process for encoding multi-level video frame tiles, in accordance with some embodiments.
Figure 12:
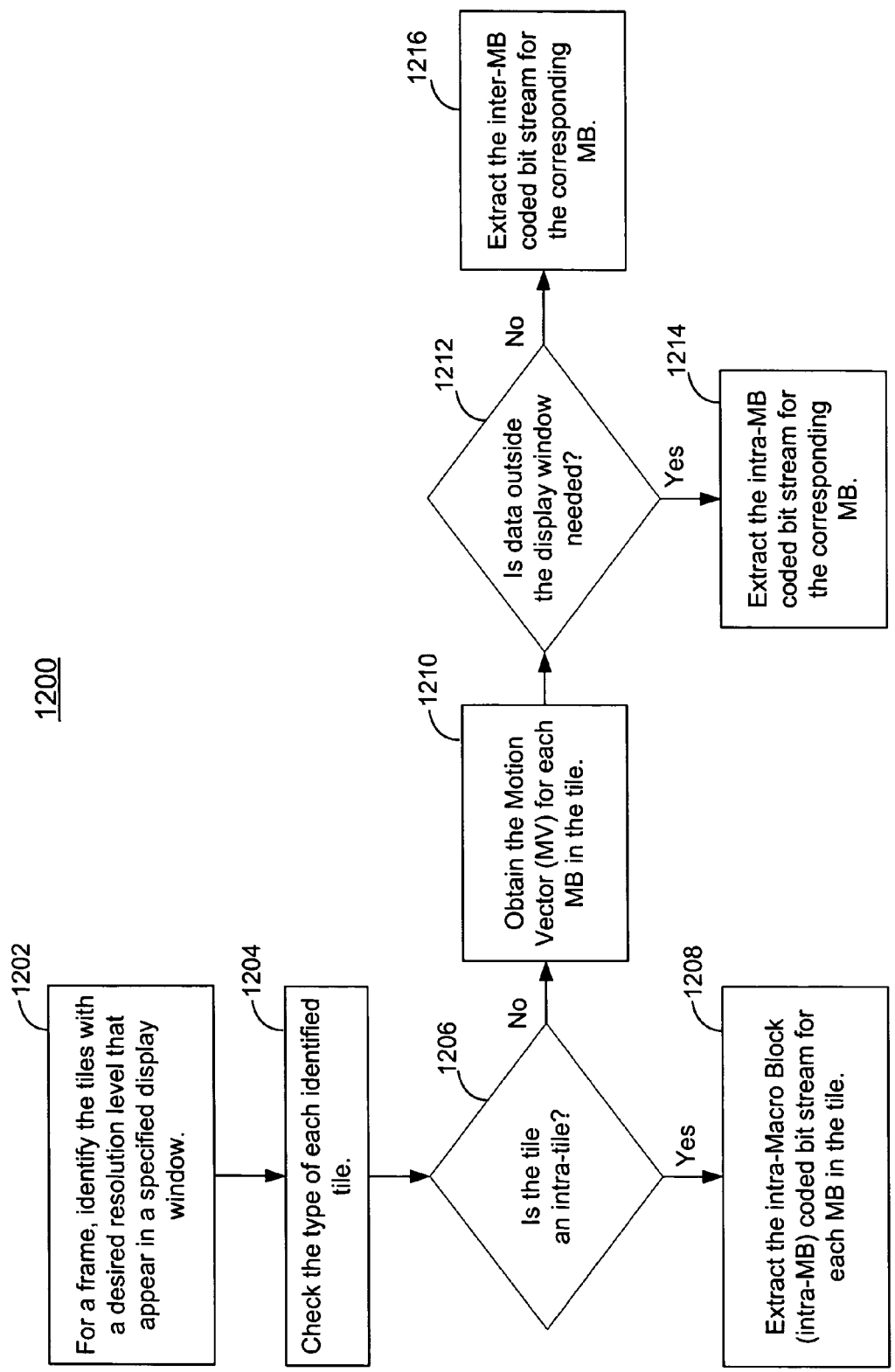
FIG. 12 is a flow diagram illustrating a process for extracting multi-level video frame tiles, in accordance with some embodiments.

Macro-block data structure 812 includes macro-block type field 814, which specifies whether the macro-block is intra-type or inter-type. Forward-prediction flag 816 and backward-prediction flag 818 indicate whether the macro-block uses motion compensation involving forward prediction and backward prediction. For example, if the macro-block is intra-type, both flags would be set to zero, indicating that neither type of motion compensation is used. Forward motion vector 820 and backward motion vector 822 provide the motion vectors needed to perform motion compensation using forward prediction and backward prediction respectively. Inter-MB bitstream 824 includes the macro-block data encoded as inter-type, while intra-MB bitstream 826 includes the macro-block data encoded as intra-type. For an intra-type macro-block, there is no inter-MB 824. An inter-type macro-block, however, may be encoded as both intra-type and inter-type, if motion compensation requires data outside the tile. In this case, both inter-MB bitstream 824 and intra-MB bitstream 826 are present, and the macro-block is said to be "dual encoded." This dual encoding is described below with regard to steps 910-912 of process 900 (FIG. 9A). In some embodiments, the intra-MB bitstream of an inter-type macro-block within the display window will be decoded and displayed if the inter-MB bitstream uses motion compensation that requires data from a tile outside the display window. Decoding and display of intra-MB bitstreams for inter-type MB's is described below with regard to steps 1212-1214 of process 1200 (FIG. 12).

FIG. 9A is a flow diagram illustrating a process 900 for encoding multi-level video frame tiles, in accordance with some embodiments. The encoding type of a multi-level video frame tile is determined (902).

If the tile is an intra-tile, each macro-block in the tile is encoded using intra-MB coding (904-Yes, 906). If the tile is an inter-tile, the motion vector for each macro-block within the tile is obtained (904-No, 908). Motion vectors are used in encoding systems such as MPEG-2 based codecs for predictive encoding of moving objects. Depending on the content of the motion vectors for the macro-blocks within the tile, the motion compensation (MC) algorithm used by the encoder may or may not require data from outside the tile (910). For example, a moving object may originate in a first tile but appear in a second tile in a later frame. If the second tile in the later frame is an inter-tile encoded using predictive encoding, it may require image data about the object from the first tile.

If, for a respective macro-block, motion compensation does not require data outside the tile, the macro-block is encoded using inter-MB coding (914). If, however, motion compensation requires data outside the tile, two versions of the macro-block are encoded: a first version using inter-MB coding and a second version using intra-MB coding (912). In some embodiments, for intra-MB coding, the image in the tile is reconstructed using both the data within the tile and the data obtained from outside the tile.

More generally, encoding two versions of a macro-block, one with inter-MB coding and one with intra-MB coding, provides flexibility in the subsequent transmission of the corresponding data to a client system for viewing. For example, either of the two macro-block versions produced in step 912 may subsequently be transmitted; the server system may decide at the time of transmission whether it is more efficient to send the inter-MB or the intra-MB.

Figure 9B:
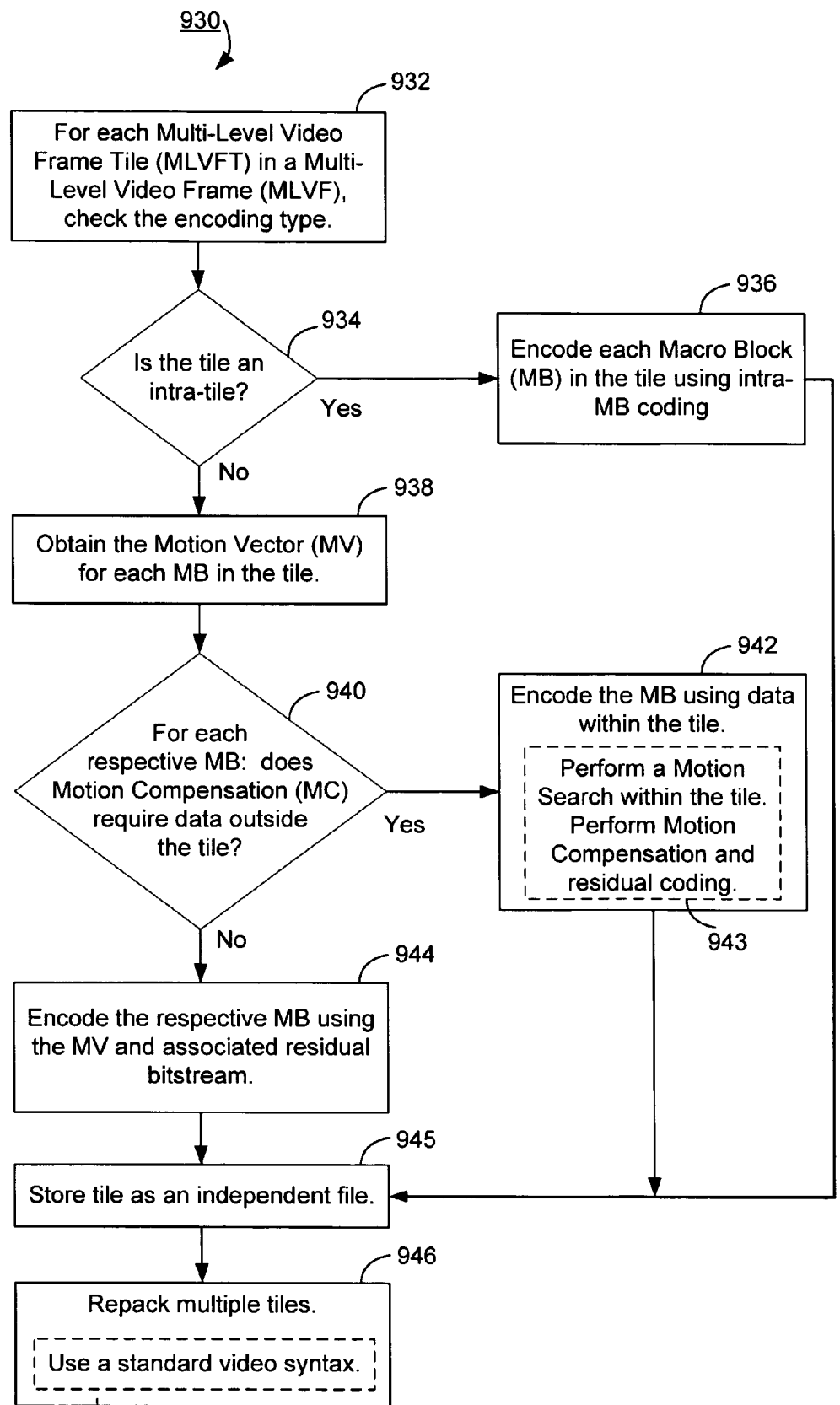

In some embodiments, however, it may be desirable to ensure that multi-level video frame tiles are independent and do not require data from other tiles. FIG. 9B is a flow diagram illustrating a process 930 for independently encoding multi-level video frame tiles, in accordance with some embodiments. For each multi-level video frame tile in a MLVF, the encoding type is determined (932).

If the tile is an intra-tile, each macro-block in the tile is encoded using intra-MB coding (934-Yes, 936). If the tile is an inter-tile, the motion vector for each macro-block within the tile is obtained (938). As described above with regard to steps 908-910 of FIG. 9A, the motion compensation (MC) algorithm used by the encoder may or may not require data from outside the tile (910), depending on the content of the motion vectors for the macro-blocks within the tile. If, for a respective macro-block, motion compensation does not require data outside the tile, the corresponding macro-block is encoded using the motion vector and associated residual bitstream (940-No, 944). If, however, motion compensation requires data outside the tile, the corresponding macro-block is not encoded using the motion vector. Instead, the corresponding macro-block is encoded using data within the tile (940-Yes, 942). In some embodiments, a motion search is performed within the tile. Based on the results of the motion search, motion compensation and residual coding are performed (943).

In some embodiments, each tile encoded according to the above steps of process 930 is stored in a separate file or data structure (945) and is independently available for subsequent transmission to a client system such as client system 200. In other embodiments, however, multiple tiles (i.e., bitstreams corresponding to the tiles) are re-packed into a single file or data structure (946) that subsequently may be transmitted to a client. In some embodiments, the re-packed tiles use standard video syntax, such as syntax compatible with the MPEG-2, MPEG-4, H.263, or H.264 standard (948).

When encoded video is delivered to a user for display, the user may desire to zoom and/or pan the displayed video. In some embodiments, a video zoom or pan starts on an I-frame, defined as a frame that does not use predictive coding. A compression algorithm in an encoding process may produce I-frames infrequently, resulting in long delays for interactive zooming and panning. Therefore, in some embodiments the re-encoding process creates I-frames from predictively encoded frames (e.g., P-frames) to prevent long delays. A maximum allowed latency is defined, measured in seconds. The maximum allowed latency represents the longest period of time that a user must wait after issuing a zoom or pan command before the command is executed. If the number of frames separating successive I-frames exceeds the maximum allowed latency multiplied by the number of frames per second, then an I-frame is created. In some embodiments, the maximum allowed latency period is in a range from 0.06 seconds to two seconds. In some embodiments, the maximum allowed latency period is as much as 30 seconds.

Figure 10A:
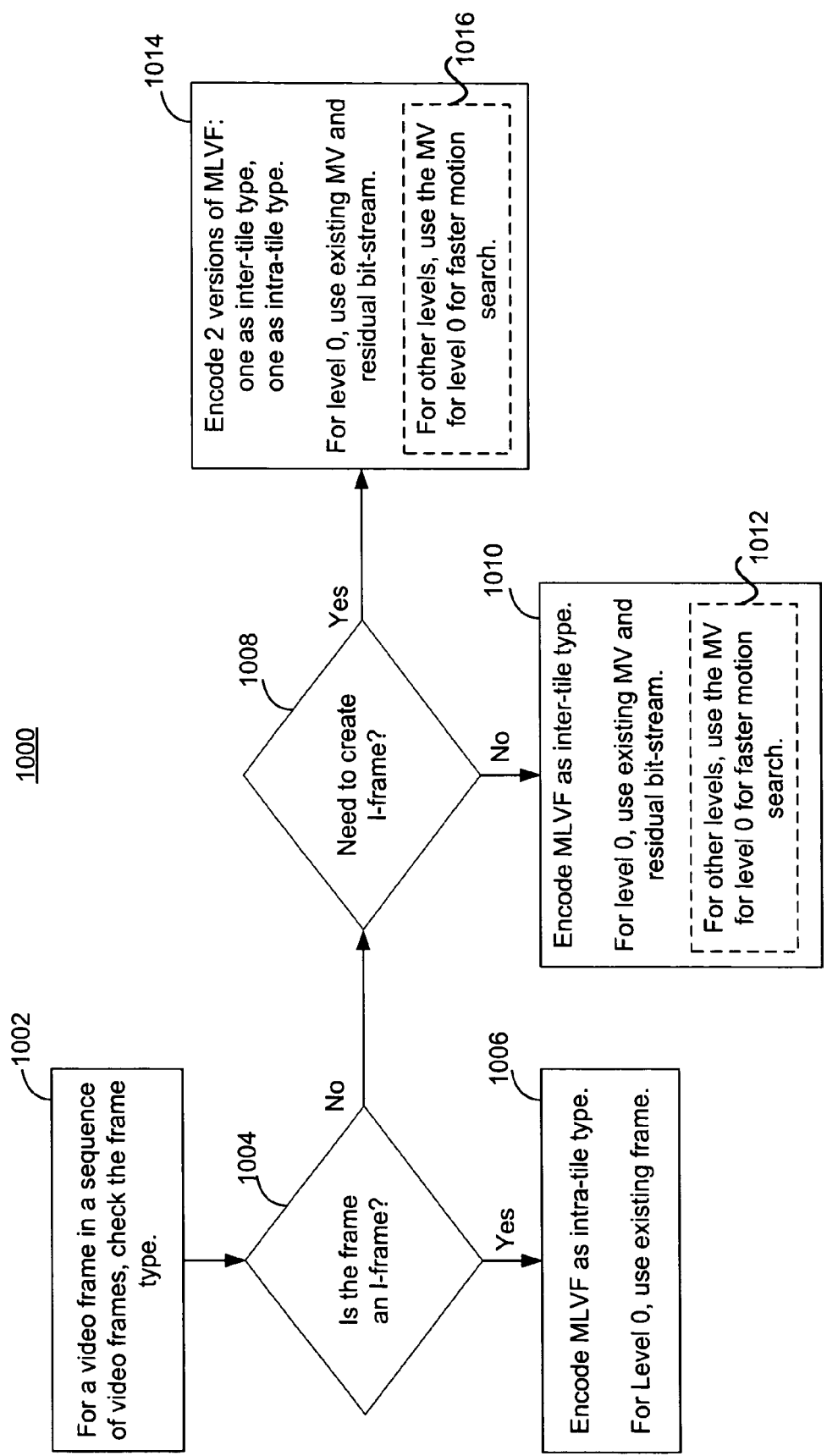
FIG. 10A is a flow diagram illustrating a process for creating I-frames when re-encoding a video frame in a sequence of video frames into a multi-level video frame in a sequence of multi-level video frames in accordance with some embodiments.

FIG. 10A is a flow diagram illustrating a process 1000 for creating I-frames when re-encoding a video frame in a sequence of video frames into a multi-level video frame in a sequence of multi-level video frames in accordance with some embodiments. The frame type of a video frame is determined (1002). If the frame is an I-frame, the MLVF tiles are encoded as intra-tiles (1004, 1006), such that each level of the MLVF is an I-frame that subsequently can be transmitted for display. If the frame is not an I-frame, the need for an I-frame is evaluated (1008). If the number of frames since the last I-frame does not exceed a predefined maximum allowed latency multiplied by the number of frames per second (1008-No), an I-frame is not needed. The MLVF tiles are encoded as inter-tiles (1010), such that each level of the MLVF is a predictively encoded frame (e.g., a P-frame) that subsequently can be transmitted for display. For level 0, the motion vectors and residual bitstream of the original frame are used. For other levels, in some embodiments, the motion vectors for level 0 are used for faster motion search (1012). Specifically, the level 0 motion vectors are used to predict where in the frame the required motion compensation data is, thus narrowing the search. In some embodiments, two versions of a respective macro-block may be encoded, one using inter-MB coding and one using intra-MB coding, as described in process 900 (FIG. 9A).

If the number of frames since the last I-frame exceeds the predefined maximum allowed latency multiplied by the number of frames per second (1008-Yes), an I-frame is needed to ensure that a zoom or pan command can be performed within the predefined maximum allowed latency period. Two versions of the MLVF are encoded: one with intra-tiles and one with inter-tiles (1014, 1016). The version with inter-tiles is encoded as described in steps 1010 and 1012, such that step 1016 corresponds to step 1012. The version with intra-tiles is encoded by reconstructing the image in the original frame and encoding each macro-block using intra-MB coding. The result is that two versions of each resolution level within the MLVF are available for subsequent transmission, one comprising inter-tiles and one comprising intra-tiles.

Process 1000 of FIG. 10A is for embodiments in which encoded video data comprising a sequence of video frames is re-encoded into a sequence of MLVFs. In other embodiments, raw video data, such as pixel data, is received from a source, such as a video camera, and encoded into a sequence of MLVFs. In some embodiments, the received video data comprises a sequence of raw video data frames corresponding to a sequence of recorded images.

Figure 10B:
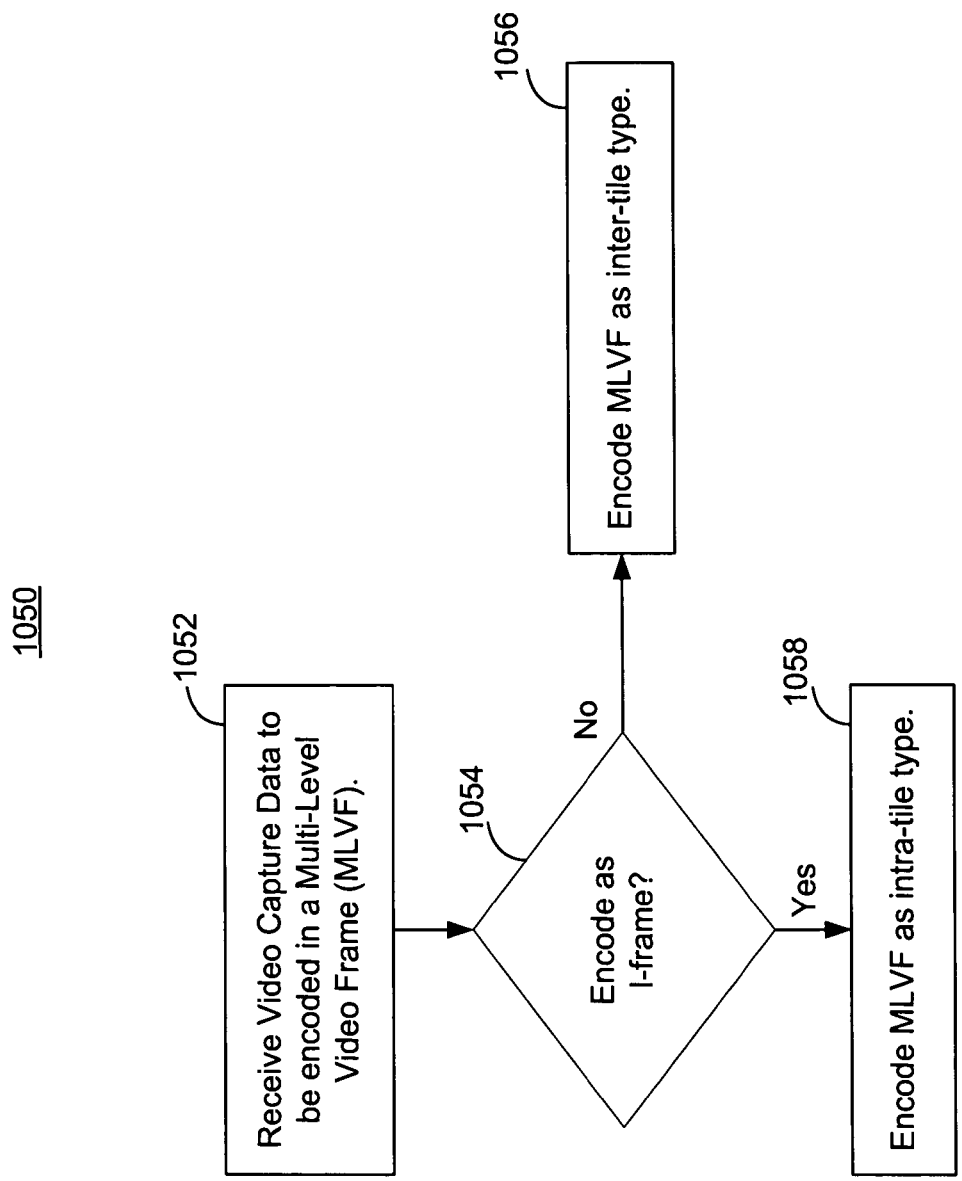
FIG. 10B is a flow diagram illustrating a process for encoding raw video data into a MLVF in a sequence of MLVFs in accordance with some embodiments.

FIG. 10B is a flow diagram illustrating a process 1050 for encoding raw video data into a MLVF in a sequence of MLVFs in accordance with some embodiments. An encoder receives raw video data to be encoded in a MLVF (1052). The encoder determines whether or not the received data is to be encoded as an I-frame (1054). If the encoder determines that the received data is not to be encoded as an I-frame (1054-No), the MLVF is encoded as inter-tile type (1056). In some embodiments, two versions of a respective macro-block may be encoded, one using inter-MB coding and one using intra-MB coding, as described in process 900 (FIG. 9A). If the encoder determines that the received data is to be encoded as an I-frame (1054-Yes), the MLVF is encoded as intra-tile type (1058). In some embodiments, the encoder generates I-frames with sufficient frequency to ensure that a zoom or pan command can be performed within a predefined maximum allowed latency period.

In some embodiments, encoding performed in accordance with a process such as process 1000 (FIG. 10A) or process 1050 (FIG. 10B) is at least partially performed by an encoder such as a MPEG-2, MPEG-4, H.263, or H.264 encoder. For example, motion search may be performed in accordance with one of the above standards to generate the level copy of a tile, prior to performing down-sampling.

Figure 11A:
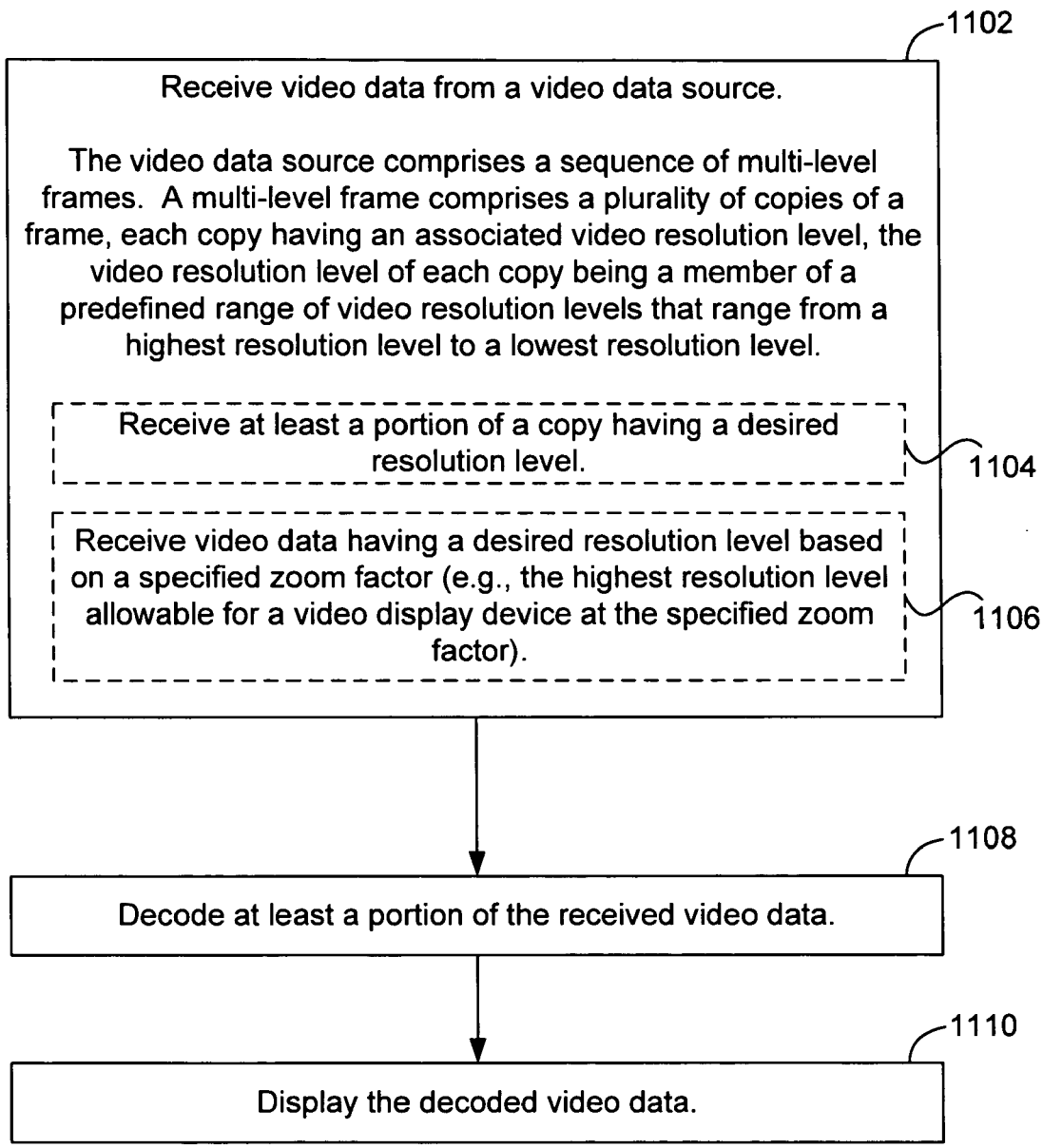
FIGS. 11A & 11B are flow diagrams illustrating a process for decoding and displaying encoded video, in accordance with some embodiments.

FIG. 11A is a flow diagram illustrating a process 1100 for decoding and displaying encoded video, in accordance with some embodiments. In some embodiments, process 1100 is performed at a client system such as client system 102 (FIG. 1). Video data is received from a video data source (1102). The video data source comprises a sequence of multi-level frames. A multi-level frame comprises a plurality of copies of a frame, each copy having an associated video resolution level, the video resolution level of each copy being a member of a predefined range of video resolution levels that range from a highest resolution level to a lowest resolution level. In some embodiments, at least a portion of a copy having a desired resolution level is received (1104). In some embodiments, video data having a desired resolution level based on a specified zoom factor is received (1106). For example, the resolution level may be the highest resolution level allowable for a video display device at the specified zoom factor.

At least a portion of the received video data is decoded (1108). In some embodiments, decoding is performed by a video decoder such as video decoder 118 (FIG. 1). In some embodiments, the video decoder 118 is an industry-standard video decoder, such as an MPEG-2, MPEG-4, H.263, or H.264 compatible decoder. The decoded video data is displayed (1110) on a device such as video display 116 (FIG. 1).

Figure 11B:
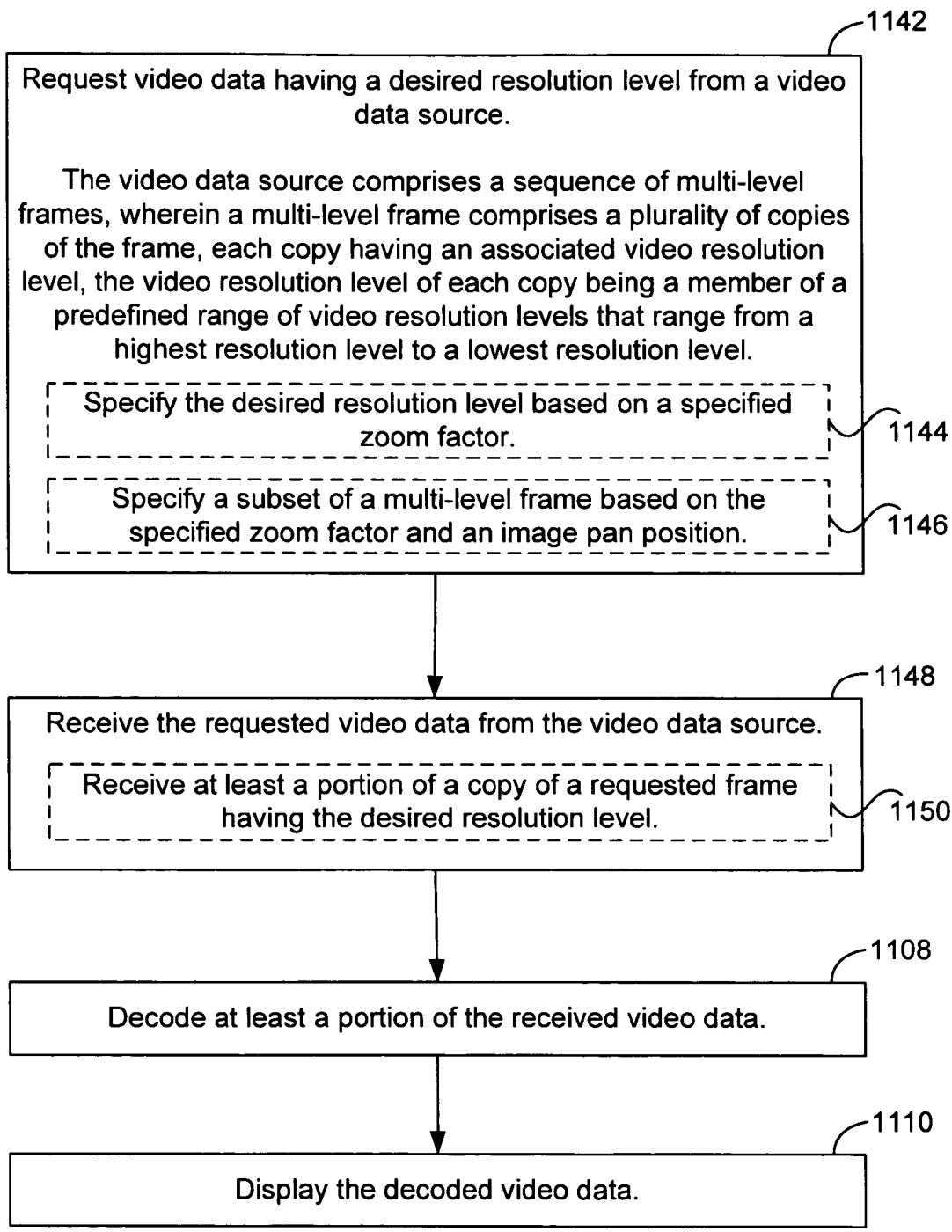

FIG. 11B is a flow diagram illustrating a process 1140 for displaying video, in accordance with some embodiments. Video data having a desired resolution level is requested from a video data source (1142). In some embodiments, a client system such as client system 102 (FIG. 1) requests the video data from a server system such as server system 104. The video data source comprises a sequence of multi-level frames. A multi-level frame comprises a plurality of copies of the frame, each copy having an associated video resolution level, the video resolution level of each copy being a member of a predefined range of video resolution levels that range from a highest resolution level to a lowest resolution level. In some embodiments, the resolution level of the video data transmitted to (and received by) the requesting device is based on the zoom factor specified by the requesting device (1144). In some embodiments, a subset of a multi-level frame is specified based on the specified zoom factor and an image pan position (1146).

The requested video data is received from the video data source (1148). In some embodiments, at least a portion of the bitstream for a copy of a requested frame having the desired resolution level is received (1150). At least a portion of the received video data is decoded (1108) and displayed (1110), as described with regard to process 1100 (FIG. 11A). As explained next in more detail, in some embodiments the portion of the requested frame that is received and decoded (by the requesting device or client system) is the smallest set of tiles in the frame that correspond to the specified zoom factor and image pan position.

In some embodiments, a display window, determined by the zoom factor and image pan position, specifies what portion of a frame is requested and displayed. Increasing the zoom factor will decrease the display window, meaning that a smaller portion of the frame will be displayed. Decreasing the zoom factor will increase the display window. Changing the image pan position will shift the display window. Once the display window is determined, the corresponding video data (e.g., the smallest set of tiles needed to cover the entire display window) is extracted, as described below with regard to FIG. 12. Extracted data is subsequently transmitted to the client or requesting device, decoded, and displayed.

FIG. 12 is a flow diagram illustrating a process 1200 for extracting multi-level video frame tiles, in accordance with some embodiments. In a frame, such as a frame containing video data requested in step 1142 of process 1140 (FIG. 11B), the tiles with a desired resolution level that appear in a specified display window are identified (1202). The identified tiles may include tiles that are only partially within the display window. The type of each identified tile is determined (1204). If the tile is an intra-tile, the intra-MB-coded bitstream is extracted for each macro-block in the tile (1206, 1208). In some embodiments, extracting the intra-MB-coded bitstream includes downloading the intra-MB coded tile from a server system to a client system.

If the tile is not an intra-tile, but instead is an inter-tile, the motion vector for each macro-block in the tile is obtained (1206, 1210). Depending on the content of the motion vector for each macro-block within the tile, data from outside the display window may or may not be needed (1212). If a particular macro-block does not need data from outside the display window (1212-No), the inter-MB coded bitstream for that macro-block is extracted (1216). If a particular macro-block needs data from outside the display window (1212-Yes), the intra-MB coded bitstream for that macro-block is extracted (1214). In some embodiments, extracting the appropriate bitstream includes downloading the bitstream from a server system to a client system. Alternately, if at least one macro-block within the tile requires data from outside the display window, the intra-MB coded bitstream for the entire tile is extracted.

Figure 13:
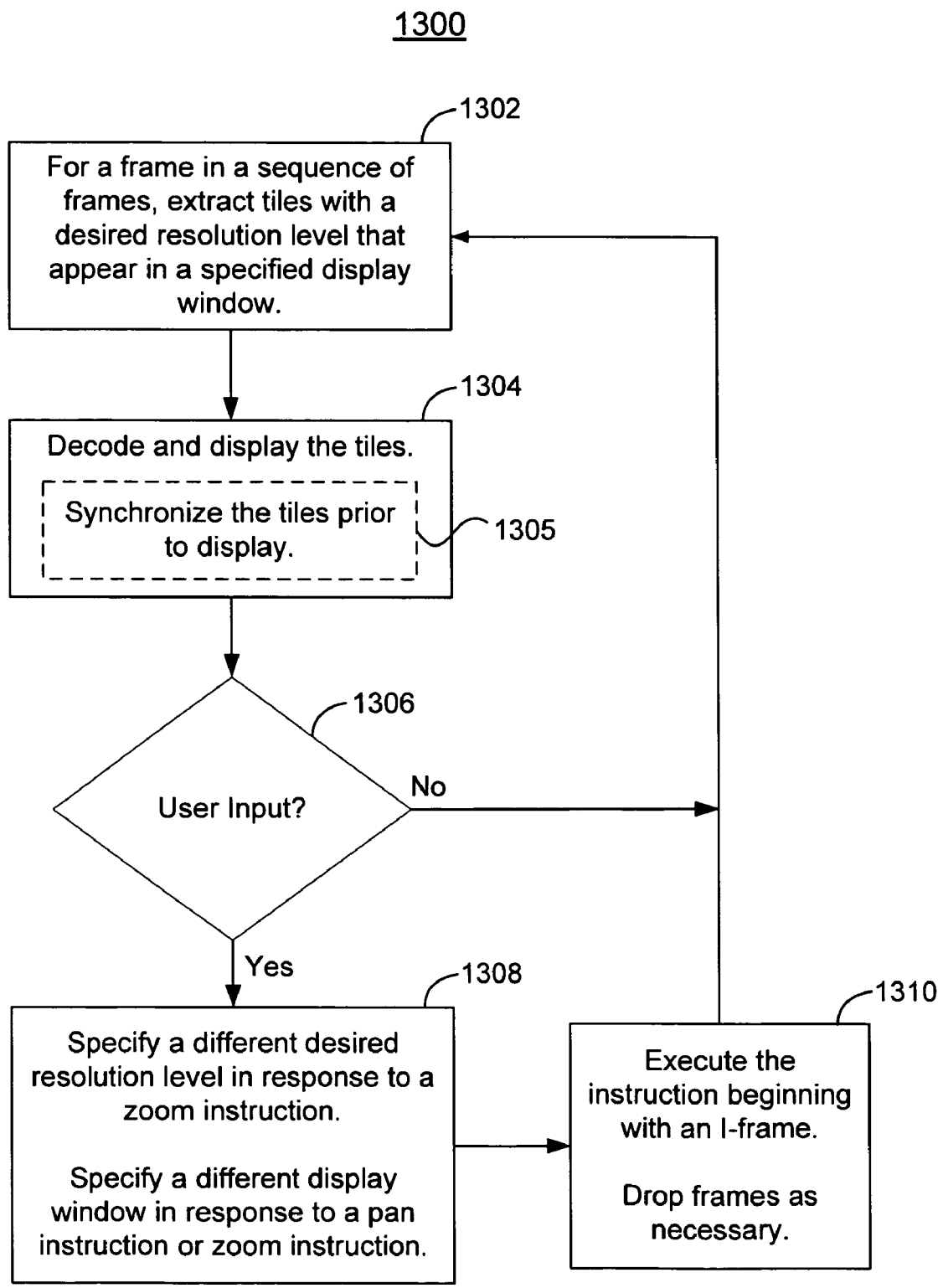
FIG. 13 is a flow diagram illustrating a process for displaying video in response to user input, in accordance with some embodiments.

User input may change the zoom factor and video pan position. FIG. 13 is a flow diagram illustrating a process 1300 for displaying video in response to user input, in accordance with some embodiments. For a frame in a sequence of frames, tiles with a desired resolution level that appear in a specified display window are extracted (1302). In some embodiments, the tiles are received from a video data source, as described in step 1102, FIG. 11A, or step 1148, FIG. 11B. The tiles are decoded and displayed (1304). In some embodiments, as discussed above with regard to FIG. 9B, tiles are encoded, stored and transmitted independently. Therefore, in some embodiments, decoded tiles are synchronized prior to display (1305).

If there is no user input, tiles for a subsequent frame are extracted (1306-No, 1302). If there is user input comprising a zoom instruction, a different desired resolution level is specified (1306, 1308). If there is user input comprising a pan instruction or a zoom instruction, a different display window is specified (1306-Yes, 1308). In some embodiments, zoom and pan instructions are executed beginning with an I-frame: the I-frame provides new data to refresh the display. Thus, beginning with an I-frame subsequent to the zoom or pan instruction, tiles with the new desired resolution level that appear within the new specified display window are extracted (1310, 1302). If necessary, frames are dropped (1310). In some embodiments, frames are dropped to ensure synchronization of video with audio, due to possible latency associated with detecting and responding to user input. The latency associated with user input is difficult to predict. Therefore, in some embodiments, video frames are dropped during the latency period while audio continues to play. Video display is resumed in synchronization with the audio once video data corresponding to the new display window becomes available.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of encoding or re-encoding video, comprising:
   receiving video data comprising a sequence of frames;
   for a respective frame in the sequence of frames, generating a multi-level frame comprising the respective frame and a plurality of copies of the respective frame, each copy having an associated video resolution level, the video resolution level of each copy being a member of a predefined range of video resolution levels that range from a highest video resolution level to a lowest video resolution level; and
   encoding the multi-level frame, the encoded multi-level frame comprising a plurality of separately encoded copies of the respective frame, each copy configured for decoding independently of the other encoded copies of the respective frame in the encoded multi-level frame;

wherein encoding the multi-level frame comprises, for each copy in the plurality of copies, partitioning the copy into tiles, and encoding the tiles, wherein each of the tiles is encoded as a plurality of macro-blocks, wherein at least one of the macro-blocks of a respective tile is dual encoded as both an intra-coded bitstream, without predictive coding, and an inter-coded bitstream, with predictive coding; and after the encoding, storing the encoded multi-level frame, including the dual-encoded macro-block, and after the encoding and storing, responding to a request from a client system by;

selecting, in accordance with a display window of the client system, one of the intra-coded bitstream and inter-coded bitstream of the dual-encoded macro-block, and transmitting to the client system the selected bitstream of the multi-level frame without transmitting the other bitstream of the dual-encoded macro-block.

2. The method of claim 1, wherein the video data comprise a MPEG-2, MPEG-4, H.263, or H.264 bitstream.

3. The method of claim 1, wherein the video data comprise raw video data.

4. The method of claim 1, wherein generating the plurality of copies comprises performing anti-aliased down-sample filtering.

5. The method of claim 1, further comprising storing at least one encoded tile as an independent file.

6. The method of claim 1, wherein the tiles are encoded using an MPEG-2, MPEG-4, H.263, or H.264 encoder.

7. The method of claim 1, further including
storing the encoded multi-level frame in a plurality of files;
after the encoding and storing, responding to the request from a client system by:
transmitting to a client system having a respective video display a bitstream corresponding to a portion of a frame in the sequence of frames in accordance with a pan position and a zoom factor, the portion of the frame transmitted to the client system comprising at least a subset of the copy of the frame, in the corresponding encoded multi-level frame, having a highest resolution level consistent with the video display device displaying the portion of the frame at the specified zoom factor.

8. A method of displaying video, for use in conjunction with a client system having a video display device, comprising:
receiving video data from a video data source, the video data source comprising a sequence of encoded multi-level frames, wherein a respective encoded multi-level frame comprises a plurality of separately encoded copies of a respective frame, each separately encoded copy having an associated video resolution level, the video resolution level of each separately encoded copy being a member of a predefined range of video resolution levels that range from a highest video resolution level to a lowest video resolution level, each separately encoded copy configured for decoding independently of the other encoded copies of the respective frame in the encoded multi-level frame;
wherein the received video data comprise, for a respective multi-level frame, at least a portion of the encoded copy having a desired resolution level;
decoding at least a portion of the received video data; and
displaying the decoded video data;
wherein the received video data include a plurality of tiles, wherein at least one of the tiles comprises a plurality of intra-coded macro-blocks and at least one of the tiles comprises a plurality of inter-coded macro-blocks; and
wherein a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding, and wherein the received video data includes, in accordance with a display window of the client system, only one of the intra-coded bitstream and inter-coded bitstream of the dual-encoded macro-block.

9. The method of claim 8, wherein the received video data are in standard video syntax.

10. The method of claim 9, wherein the standard video syntax is compatible with MPEG-2, MPEG-4, H.263, or H.264 decoders.

11. The method of claim 8, wherein the desired resolution level is determined based on a specified zoom factor for displaying the video.

12. The method of claim 11, wherein the desired resolution level is a highest resolution level allowable for the video display device at the specified zoom factor.

13. The method of claim 11, including requesting the video data, the request specifying the desired video resolution level, wherein the desired video resolution level comprises a highest resolution level consistent with the video display device displaying a portion of the frame at the specified zoom factor.

14. The method of claim 8, including requesting the video data, wherein the request specifies a subset of the respective multi-level frame in accordance with a specified zoom factor and a pan position of the displayed image, and wherein the desired video resolution level comprises a highest resolution level consistent with the video display device displaying a portion of the respective multi-level frame at the specified zoom factor.

15. A system for encoding or re-encoding video, comprising:
memory;
one or more processors;
one or more programs stored in the memory and configured for execution by the one or more processors, the one or more programs including:
instructions for receiving video data comprising a sequence of frames;
instructions for generating, for a respective frame in the sequence of frames, a multi-level frame comprising the respective frame and a plurality of copies of the respective frame, each copy having an associated video resolution level, the video resolution level of each copy being a member of a predefined range of video resolution levels that range from a highest video resolution level to a lowest video resolution level; and
instructions for encoding the multi-level frame, the encoded multi-level frame include a plurality of separately encoded copies of the respective frame, each copy configured for decoding independently of the other encoded copies of the respective frame in the encoded multi-level frame;
wherein the instructions for encoding include instructions for encoding the respective frame at a respective video resolution level as a plurality of tiles, for encoding each of the tiles as a plurality of macro-blocks, and for dual encoding at least one of the macro-blocks of a respective tile as both an intra-coded bitstream, without predictive coding, and an inter-coded bitstream, with predictive coding;

the one or more programs further including instructions for storing the encoded multi-level frame, including the dual-encoded macro-block, and after the encoding and storing, responding to a request from a client system by selecting, in accordance with a display window, one of the intra-coded bitstream and inter-coded bitstream of the dual-encoded macro-block, and transmitting to the client system the selected bitstream of the multi-level frame without transmitting the other bitstream of the dual-encoded macro-block.

16. A client system for displaying video, for use in conjunction with a video display device, comprising:
memory;
one or more processors;
one or more programs stored in the memory and configured for execution by the one or more processors, the one or more programs including:
instructions for receiving video data from a video data source, the video data source comprising a sequence of encoded multi-level frames, wherein a respective encoded multi-level frame comprises a plurality of separately encoded copies of a respective frame, each separately encoded copy having an associated video resolution level, the video resolution level of each separately encoded copy being a member of a predefined range of video resolution levels that range from a highest video resolution level to a lowest video resolution level, each separately encoded copy configured for decoding independently of the other encoded copies of the respective frame in the encoded multi-level frame;
wherein the received video data comprise, for a respective multi-level frame, at least a portion of the encoded copy having a desired resolution level;
instructions for decoding at least a portion of the received video data; and
instructions for displaying the decoded video data;
wherein the received video data include a plurality of tiles, wherein at least one of the tiles comprises a plurality of intra-coded macro-blocks and at least one of the tiles comprises a plurality of inter-coded macro-blocks; and
wherein a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding, and wherein the received video data includes, in accordance with a display window of the client system, only one of the intra-coded bitstream and inter-coded bitstream of the dual-encoded macro-block.

17. A non-transitory computer readable storage medium storing one or more programs for execution by one or more processors of a computer system, the one or more programs comprising:
instructions for receiving video data comprising a sequence of frames;
instructions for generating, for a respective frame in the sequence of frames, a multi-level frame comprising the respective frame and a plurality of copies of the respective frame, each copy having an associated video resolution level, the video resolution level of each copy being a member of a predefined range of video resolution levels that range from a highest video resolution level to a lowest video resolution level; and instructions for encoding the multi-level frame, the encoded multi-level frame comprising a plurality of separately encoded copies of the respective frame, each copy configured for decoding independently of the other encoded copies of the respective frame in the encoded multi-level frame;
wherein the instructions for encoding include instructions for encoding the respective frame at a respective video resolution level as a plurality of tiles, for encoding each of the tiles as a plurality of macro-blocks, and for dual encoding at least one of the macro-blocks of a respective tile as both an intra-coded bitstream, without predictive coding, and an inter-coded bitstream, with predictive coding;
the one or more programs further including instructions for storing the encoded multi-level frame, including the dual-encoded macro-block, and after the encoding and storing, responding to a request from a client system by selecting, in accordance with a display window, one of the intra-coded bitstream and inter-coded bitstream of the dual-encoded macro-block, and transmitting to the client system the selected bitstream of the multi-level frame without transmitting the other bitstream of the dual-encoded macro-block.

18. A non-transitory computer readable storage medium storing one or more programs for execution by one or more processors of a client system having a video display device, the one or more programs comprising:
instructions for receiving video data from a video data source, the video data source comprising a sequence of encoded multi-level frames, wherein a respective encoded multi-level frame comprises a plurality of separately encoded copies of a respective frame, each separately encoded copy having an associated video resolution level, the video resolution level of each separately encoded copy being a member of a predefined range of video resolution levels that range from a highest video resolution level to a lowest video resolution level, each separately encoded copy configured for decoding independently of the other encoded copies of the respective frame in the encoded multi-level frame;
wherein the received video data comprise, for a respective multi-level frame, at least a portion of the encoded copy having a desired resolution level;
instructions for decoding at least a portion of the received video data; and
instructions for displaying the decoded video data;
wherein the received video data includes a plurality of tiles, wherein at least one of the tiles comprises a plurality of intra-coded macro-blocks and at least one of the tiles comprises a plurality of inter-coded macro-blocks; and
wherein a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding, and wherein the received video data includes, in accordance with a display window of the client system, only one of the intra-coded bitstream and inter-coded bitstream of the dual-encoded macro-block.

19. A system for encoding video, comprising:
means for receiving video data comprising a sequence of frames;
means for generating, for a respective frame in the sequence of frames, a multi-level frame comprising the respective frame and a plurality of copies of the respective frame, each copy having an associated video resolution level, the video resolution level of each copy being a member of a predefined range of video resolution levels that range from a highest video resolution level to a lowest video resolution level;

means for encoding the multi-level frame, the encoded multi-level frame comprising a plurality of separately encoded copies of the respective frame, each copy configured for decoding independently of the other encoded copies of the respective frame in the encoded multi-level frame, wherein the means for encoding is for encoding the respective frame at a respective video resolution level as a plurality of tiles, for encoding each of the tiles as a plurality of macro-blocks, and for dual encoding at least one of the macro-blocks of a respective tile as both an intra-coded bitstream, without predictive coding, and an inter-coded bitstream, with predictive coding; and means for storing the encoded multi-level frame, including the dual-encoded macro-block, and after the encoding and storing, responding to a request from a client system by selecting, in accordance with a display window, one of the intra-coded bitstream and inter-coded bitstream of the dual-encoded macro-block and transmitting to the client system the selected bitstream of the multi-level frame without transmitting the other bitstream of the dual-encoded macro-block.

20. A system for displaying video, for use in conjunction with a video display device, comprising:

means for receiving video data from a video data source, the video data source comprising a sequence of encoded multi-level frames, wherein a respective encoded multi-level frame comprises a plurality of separately encoded copies of a respective frame, each separately encoded copy having an associated video resolution level, the video resolution level of each separately encoded copy being a member of a predefined range of video resolution levels that range from a highest video resolution level to a lowest video resolution level, each separately encoded copy configured for decoding independently of the other encoded copies of the respective frame in the encoded multi-level frame;

wherein the received video data comprise, for a respective multi-level frame, at least a portion of the encoded copy having a desired resolution level;

means for decoding at least a portion of the received video data; and means for displaying the decoded video data;

wherein the received video data includes a plurality of tiles, wherein at least one of the tiles comprises a plurality of intra-coded macro-blocks and at least one of the tiles comprises a plurality of inter-coded macro-blocks; and wherein a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding, and wherein the received video data includes, in accordance with a display window of the client system, only one of the intra-coded bitstream and inter-coded bitstream of the dual-encoded macro-block.

21. A method of displaying video, for use in conjunction with a video display device, comprising:

receiving encoded video data comprising a sequence of multi-level frames, wherein a respective multi-level frame comprises a plurality of separately encoded copies of a respective frame, each separately encoded copy having an associated video resolution level, the video resolution level of each separately encoded copy being a member of a predefined range of video resolution levels that range from a highest video resolution level to a lowest video resolution level, wherein each separately encoded copy is configured for decoding independently of the other encoded copies of the respective frame in the encoded multi-level frame;

for a respective multi-level frame, determining a desired resolution level, wherein the desired video resolution level comprises a highest resolution level consistent with the video display device displaying a portion of the respective multi-level frame at a specified zoom factor;

decoding at least a portion of the copy having the desired resolution level; and displaying the decoded video data;

wherein the received video data include a plurality of tiles, wherein at least one of the tiles comprises a plurality of intra-coded macro-blocks and at least one of the tiles comprises a plurality of inter-coded macro-blocks; and wherein a respective tile of the plurality of tiles, as stored at the video source, comprises a plurality of macro-blocks, including at least one macro-block that is dual encoded as both an intra-coded bitstream, without predictive coding, and an inter-coded bitstream, with predictive coding, and wherein the received video data includes, in accordance with a display window of the client system, only one of the intra-coded bitstream and inter-coded bitstream of the dual-encoded macro-block.

* * * * *